(12) United States Patent
Gore et al.

(10) Patent No.: US 8,681,764 B2
(45) Date of Patent: Mar. 25, 2014

(54) FREQUENCY DIVISION MULTIPLE ACCESS SCHEMES FOR WIRELESS COMMUNICATION

(75) Inventors: Dhananjay Ashok Gore, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 12/952,019

(22) Filed: Nov. 22, 2010

(65) Prior Publication Data

US 2011/0064070 A1    Mar. 17, 2011

Related U.S. Application Data

(62) Division of application No. 11/325,980, filed on Jan. 4, 2006, now Pat. No. 8,582,548.

(60) Provisional application No. 60/738,129, filed on Nov. 18, 2005.

(51) Int. Cl.
*H04B 7/208* (2006.01)
*H04J 11/00* (2006.01)
*H04J 3/00* (2006.01)

(52) U.S. Cl.
USPC ............................ 370/344; 370/208; 370/337

(58) Field of Classification Search
USPC ........................................................ 370/344
See application file for complete search history.

(56) References Cited

U.S. PATENT DOCUMENTS

| | | | |
|---|---|---|---|
| 4,393,276 A | 7/1983 | Steele | |
| 4,554,668 A | 11/1985 | Deman et al. | |
| 4,747,137 A | 5/1988 | Matsunaga | |
| 4,783,779 A | 11/1988 | Takahata et al. | |

(Continued)

FOREIGN PATENT DOCUMENTS

| | | |
|---|---|---|
| AU | 2005319084 | 4/2010 |
| CA | 2348137 | 11/2001 |

(Continued)

OTHER PUBLICATIONS

Chiani, et al. "Outage Evaluation for Slow Frequency-Hopping Mobile Radio Systems" IEEE Transactions on Communications, vol. 47, No. 12, Dec. 1999, pp. 1865-1874.

(Continued)

*Primary Examiner* — Huy C Ho
(74) *Attorney, Agent, or Firm* — Kam T. Tam

(57) ABSTRACT

Techniques for transmitting data using single-carrier frequency division multiple access (SC-FDMA) multiplexing schemes are described. In one aspect, data is sent on sets of adjacent subbands that are offset from one another to achieve frequency diversity. A terminal may be assigned a set of N adjacent subbands that is offset by less than N (e.g., N/2) subbands from another set of N adjacent subbands assigned to another terminal and would then observe interference on only subbands that overlap. In another aspect, a multi-carrier transmission symbol is generated with multi-carrier SC-FDMA. Multiple waveforms carrying modulation symbols in the time domain on multiple sets of subbands are generated. The multiple waveforms are pre-processed (e.g., cyclically delayed by different amounts) to obtain pre-processed waveforms, which are combined (e.g., added) to obtain a composite waveform. A cyclic prefix is appended to the composite waveform to generate the multi-carrier transmission symbol.

20 Claims, 12 Drawing Sheets

(56) References Cited

U.S. PATENT DOCUMENTS

| | | |
|---|---|---|
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,088,345 A | 7/2000 | Sakoda et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |

(56) References Cited

U.S. PATENT DOCUMENTS

| | | |
|---|---|---|
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,215,979 B2 | 5/2007 | Nakagawa et al. |
| 7,230,941 B2 | 6/2007 | Odenwalder et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissani (Nissensohn) |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |

(56) References Cited

U.S. PATENT DOCUMENTS

| | | | |
|---|---|---|---|
| 7,418,246 B2 | 8/2008 | Kim et al. | |
| 7,423,991 B2 | 9/2008 | Cho et al. | |
| 7,426,426 B2 | 9/2008 | Van Baren | |
| 7,428,426 B2 | 9/2008 | Kiran et al. | |
| 7,433,661 B2 | 10/2008 | Kogiantis et al. | |
| 7,437,164 B2 | 10/2008 | Agrawal et al. | |
| 7,443,835 B2 | 10/2008 | Lakshmi Narayanan et al. | |
| 7,447,270 B1 | 11/2008 | Hottinen | |
| 7,450,548 B2 | 11/2008 | Haustein et al. | |
| 7,460,466 B2 | 12/2008 | Lee et al. | |
| 7,463,698 B2 * | 12/2008 | Fujii et al. | 375/303 |
| 7,468,943 B2 | 12/2008 | Gu et al. | |
| 7,469,011 B2 | 12/2008 | Lin et al. | |
| 7,471,963 B2 | 12/2008 | Kim et al. | |
| 7,483,408 B2 | 1/2009 | Bevan et al. | |
| 7,483,719 B2 | 1/2009 | Kim et al. | |
| 7,486,735 B2 | 2/2009 | Dubuc et al. | |
| 7,492,788 B2 | 2/2009 | Zhang et al. | |
| 7,499,393 B2 | 3/2009 | Ozluturk | |
| 7,508,748 B2 | 3/2009 | Kadous | |
| 7,508,842 B2 | 3/2009 | Baum et al. | |
| 7,512,096 B2 | 3/2009 | Kuzminskiy et al. | |
| 7,545,867 B1 | 6/2009 | Lou et al. | |
| 7,548,506 B2 | 6/2009 | Ma et al. | |
| 7,551,546 B2 | 6/2009 | Ma et al. | |
| 7,551,564 B2 | 6/2009 | Mattina | |
| 7,558,293 B2 | 7/2009 | Choi et al. | |
| 7,567,621 B2 | 7/2009 | Sampath et al. | |
| 7,573,900 B2 | 8/2009 | Kim et al. | |
| 7,599,327 B2 | 10/2009 | Zhuang | |
| 7,616,955 B2 | 11/2009 | Kim | |
| 7,623,442 B2 | 11/2009 | Laroia et al. | |
| 7,627,051 B2 | 12/2009 | Shen et al. | |
| 7,664,061 B2 | 2/2010 | Hottinen | |
| 7,676,007 B1 | 3/2010 | Choi et al. | |
| 7,684,507 B2 | 3/2010 | Levy | |
| 7,724,777 B2 | 5/2010 | Sutivong et al. | |
| 7,768,979 B2 | 8/2010 | Sutivong et al. | |
| 7,899,497 B2 | 3/2011 | Kish et al. | |
| 7,916,624 B2 | 3/2011 | Laroia et al. | |
| 7,924,699 B2 | 4/2011 | Laroia et al. | |
| 7,990,843 B2 | 8/2011 | Laroia et al. | |
| 7,990,844 B2 | 8/2011 | Laroia et al. | |
| 8,014,271 B2 | 9/2011 | Laroia et al. | |
| 8,045,512 B2 | 10/2011 | Khandekar et al. | |
| 8,095,141 B2 | 1/2012 | Teague | |
| 8,098,568 B2 | 1/2012 | Laroia et al. | |
| 8,098,569 B2 | 1/2012 | Laroia et al. | |
| 8,446,892 B2 | 5/2013 | Ji et al. | |
| 8,462,859 B2 | 6/2013 | Sampath et al. | |
| 8,477,684 B2 | 7/2013 | Khandekar et al. | |
| 8,565,194 B2 | 10/2013 | Gorokhov et al. | |
| 2001/0021180 A1 | 9/2001 | Lee et al. | |
| 2001/0024427 A1 | 9/2001 | Suzuki | |
| 2001/0030948 A1 | 10/2001 | Tiedemann, Jr. | |
| 2001/0053140 A1 | 12/2001 | Choi et al. | |
| 2001/0055294 A1 | 12/2001 | Motoyoshi | |
| 2002/0015405 A1 | 2/2002 | Sepponen et al. | |
| 2002/0018157 A1 | 2/2002 | Zhang et al. | |
| 2002/0044524 A1 | 4/2002 | Laroia et al. | |
| 2002/0061742 A1 | 5/2002 | Lapaille et al. | |
| 2002/0077152 A1 | 6/2002 | Johnson et al. | |
| 2002/0085521 A1 | 7/2002 | Tripathi et al. | |
| 2002/0090004 A1 | 7/2002 | Rinchiuso | |
| 2002/0090024 A1 | 7/2002 | Tan | |
| 2002/0122400 A1 | 9/2002 | Vayanos et al. | |
| 2002/0128035 A1 | 9/2002 | Jokinen et al. | |
| 2002/0159422 A1 | 10/2002 | Li et al. | |
| 2002/0160781 A1 | 10/2002 | Bark et al. | |
| 2002/0168946 A1 | 11/2002 | Aizawa et al. | |
| 2002/0172293 A1 | 11/2002 | Kuchi et al. | |
| 2002/0176398 A1 | 11/2002 | Nidda | |
| 2002/0193146 A1 | 12/2002 | Wallace et al. | |
| 2003/0002464 A1 | 1/2003 | Rezaiifar et al. | |
| 2003/0035491 A1 | 2/2003 | Walton et al. | |
| 2003/0040283 A1 | 2/2003 | Kawai et al. | |
| 2003/0043732 A1 | 3/2003 | Walton et al. | |
| 2003/0043764 A1 | 3/2003 | Kim et al. | |
| 2003/0063579 A1 | 4/2003 | Lee | |
| 2003/0068983 A1 | 4/2003 | Kim et al. | |
| 2003/0072280 A1 | 4/2003 | McFarland et al. | |
| 2003/0072395 A1 | 4/2003 | Jia et al. | |
| 2003/0073409 A1 | 4/2003 | Nobukiyo et al. | |
| 2003/0073464 A1 | 4/2003 | Giannakis et al. | |
| 2003/0076890 A1 | 4/2003 | Hochwald et al. | |
| 2003/0086393 A1 | 5/2003 | Vasudevan et al. | |
| 2003/0096579 A1 | 5/2003 | Ito et al. | |
| 2003/0103520 A1 | 6/2003 | Chen et al. | |
| 2003/0112745 A1 | 6/2003 | Zhuang et al. | |
| 2003/0123414 A1 | 7/2003 | Tong et al. | |
| 2003/0125040 A1 | 7/2003 | Walton et al. | |
| 2003/0142648 A1 | 7/2003 | Semper | |
| 2003/0147371 A1 | 8/2003 | Choi et al. | |
| 2003/0157900 A1 | 8/2003 | Gaal et al. | |
| 2003/0181170 A1 | 9/2003 | Sim | |
| 2003/0185310 A1 | 10/2003 | Ketchum et al. | |
| 2003/0190897 A1 | 10/2003 | Lei et al. | |
| 2003/0193915 A1 | 10/2003 | Lee et al. | |
| 2003/0202491 A1 | 10/2003 | Tiedemann, Jr. et al. | |
| 2003/0228850 A1 | 12/2003 | Hwang | |
| 2003/0235255 A1 | 12/2003 | Ketchum et al. | |
| 2004/0002364 A1 | 1/2004 | Trikkonen et al. | |
| 2004/0015692 A1 | 1/2004 | Green et al. | |
| 2004/0017785 A1 | 1/2004 | Zelst | |
| 2004/0048609 A1 | 3/2004 | Kosaka | |
| 2004/0058687 A1 | 3/2004 | Kim et al. | |
| 2004/0066761 A1 | 4/2004 | Giannakis et al. | |
| 2004/0072565 A1 | 4/2004 | Nobukiyo et al. | |
| 2004/0076185 A1 | 4/2004 | Kim et al. | |
| 2004/0077379 A1 | 4/2004 | Smith et al. | |
| 2004/0081195 A1 | 4/2004 | El-Maleh et al. | |
| 2004/0087325 A1 | 5/2004 | Cheng et al. | |
| 2004/0097215 A1 | 5/2004 | Abe et al. | |
| 2004/0098505 A1 | 5/2004 | Clemmensen | |
| 2004/0105489 A1 | 6/2004 | Kim et al. | |
| 2004/0114618 A1 | 6/2004 | Tong et al. | |
| 2004/0120411 A1 | 6/2004 | Walton et al. | |
| 2004/0125792 A1 | 7/2004 | Bradbury et al. | |
| 2004/0131007 A1 * | 7/2004 | Smee et al. | 370/208 |
| 2004/0136344 A1 | 7/2004 | Kim et al. | |
| 2004/0136349 A1 | 7/2004 | Walton et al. | |
| 2004/0156328 A1 | 8/2004 | Walton et al. | |
| 2004/0160914 A1 | 8/2004 | Sarkar | |
| 2004/0160933 A1 | 8/2004 | Odenwalder et al. | |
| 2004/0166867 A1 | 8/2004 | Hawe | |
| 2004/0166887 A1 | 8/2004 | Laroia et al. | |
| 2004/0170152 A1 | 9/2004 | Nagao et al. | |
| 2004/0170157 A1 | 9/2004 | Kim et al. | |
| 2004/0171384 A1 | 9/2004 | Holma et al. | |
| 2004/0179627 A1 | 9/2004 | Ketchum et al. | |
| 2004/0185792 A1 | 9/2004 | Alexiou et al. | |
| 2004/0202257 A1 | 10/2004 | Mehta et al. | |
| 2004/0208138 A1 | 10/2004 | Hayashi et al. | |
| 2004/0219819 A1 | 11/2004 | Di Mascio | |
| 2004/0219919 A1 | 11/2004 | Whinnett et al. | |
| 2004/0224711 A1 | 11/2004 | Panchal et al. | |
| 2004/0228313 A1 | 11/2004 | Cheng et al. | |
| 2004/0240419 A1 | 12/2004 | Abrishamkar et al. | |
| 2004/0240572 A1 | 12/2004 | Brutel et al. | |
| 2004/0248604 A1 | 12/2004 | Vaidyanathan | |
| 2004/0252529 A1 | 12/2004 | Huber et al. | |
| 2004/0252629 A1 | 12/2004 | Hasegawa et al. | |
| 2004/0252655 A1 | 12/2004 | Lim et al. | |
| 2004/0252662 A1 | 12/2004 | Cho | |
| 2004/0257979 A1 | 12/2004 | Ro et al. | |
| 2004/0264507 A1 | 12/2004 | Cho et al. | |
| 2005/0002412 A1 | 1/2005 | Sagfors et al. | |
| 2005/0002440 A1 | 1/2005 | Alamouti et al. | |
| 2005/0002468 A1 | 1/2005 | Walton et al. | |
| 2005/0003782 A1 | 1/2005 | Wintzell | |
| 2005/0008091 A1 | 1/2005 | Boutros et al. | |
| 2005/0009486 A1 | 1/2005 | Al-Dhahir et al. | |
| 2005/0013263 A1 | 1/2005 | Kim et al. | |
| 2005/0030886 A1 | 2/2005 | Wu et al. | |

(56) References Cited

U.S. PATENT DOCUMENTS

| | | |
|---|---|---|
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085236 A1 | 4/2005 | Gerlach et al. |
| 2005/0111397 A1 | 5/2005 | Attar et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265293 A1 | 12/2005 | Ro et al. |
| 2005/0265470 A1 | 12/2005 | Kishigami et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0092054 A1 | 5/2006 | Li et al. |
| 2006/0104333 A1 | 5/2006 | Rainbolt et al. |
| 2006/0104381 A1 | 5/2006 | Menon et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |

(56) References Cited

U.S. PATENT DOCUMENTS

| | | |
|---|---|---|
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 19931400 | 12/1994 |
| CL | 8461997 | 1/1998 |
| CL | 009531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |
| CL | 29062006 | 5/2007 |
| CL | 29042006 | 6/2007 |
| CL | 29022006 | 7/2007 |
| CL | 29082006 | 10/2007 |
| CL | 46151 | 12/2009 |
| CL | 29012006 | 1/2010 |
| CL | 29072006 | 1/2010 |
| CN | 1252919 | 5/2000 |
| CN | 1267437 A | 9/2000 |
| CN | 1284795 | 2/2001 |
| CN | 1296682 | 5/2001 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1647436 | 7/2005 |
| DE | 19800953 C1 | 7/1999 |
| DE | 19957288 C1 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1180907 A2 | 2/2002 |
| EP | 1187506 A1 | 3/2002 |
| EP | 1204217 A1 | 5/2002 |
| EP | 1255369 | 11/2002 |
| EP | 1267513 | 12/2002 |
| EP | 1286490 A2 | 2/2003 |
| EP | 1335504 A2 | 8/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1542488 A1 | 6/2005 |
| EP | 1601149 A2 | 11/2005 |
| EP | 1643669 A1 | 4/2006 |
| EP | 1538863 A1 | 6/2006 |
| EP | 1898542 A1 | 3/2008 |
| EP | 1941693 | 7/2011 |
| FR | 2584884 | 1/1987 |
| GB | 2279540 A | 1/1995 |
| GB | 2348776 A | 10/2000 |
| GB | 2412541 | 9/2005 |
| IL | 167573 | 2/2011 |
| IL | 201872 | 5/2012 |
| JP | H04111544 A | 4/1992 |
| JP | 4301931 A | 10/1992 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 1997182148 A | 7/1997 |
| JP | 09214404 | 8/1997 |
| JP | 9284200 A | 10/1997 |

(56) References Cited

FOREIGN PATENT DOCUMENTS

| | | |
|---|---|---|
| JP | 10117162 | 5/1998 |
| JP | H10210000 A | 8/1998 |
| JP | 10322304 | 12/1998 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 A | 4/2000 |
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 | 1/2005 |
| JP | 2005502218 A | 1/2005 |
| JP | 2005506757 | 3/2005 |
| JP | 2005130491 A | 5/2005 |
| JP | 2005197772 | 7/2005 |
| JP | 2005203961 | 7/2005 |
| JP | 2005521327 | 7/2005 |
| JP | 2005521358 | 7/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2007500486 A | 1/2007 |
| JP | 2007503790 | 2/2007 |
| JP | 2007519281 | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2192094 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 C1 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 | 4/1994 |
| WO | WO9521494 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 | 1/1998 |
| WO | WO9814026 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO9941871 A1 | 8/1999 |
| WO | WO9944313 | 9/1999 |
| WO | WO9944383 A1 | 9/1999 |
| WO | WO9952250 A1 | 10/1999 |

(56) References Cited

FOREIGN PATENT DOCUMENTS

| | | |
|---|---|---|
| WO | WO9953713 | 10/1999 |
| WO | WO9959265 | 11/1999 |
| WO | WO9960729 A1 | 11/1999 |
| WO | WO0002397 | 1/2000 |
| WO | WO0033503 | 6/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO0139523 A2 | 5/2001 |
| WO | WO0145300 | 6/2001 |
| WO | WO0148969 A2 | 7/2001 |
| WO | WO0158054 A1 | 8/2001 |
| WO | WO0160106 | 8/2001 |
| WO | WO0169814 A1 | 9/2001 |
| WO | WO0182543 | 11/2001 |
| WO | WO0182544 A2 | 11/2001 |
| WO | WO0189112 A1 | 11/2001 |
| WO | WO0193505 | 12/2001 |
| WO | WO0204936 A1 | 1/2002 |
| WO | WO0207375 | 1/2002 |
| WO | WO0215616 | 2/2002 |
| WO | WO0219746 A1 | 3/2002 |
| WO | WO0231991 | 4/2002 |
| WO | WO0233848 A2 | 4/2002 |
| WO | WO0245456 A1 | 6/2002 |
| WO | WO0249305 A2 | 6/2002 |
| WO | WO0249306 A2 | 6/2002 |
| WO | WO0249385 A2 | 6/2002 |
| WO | WO02060138 | 8/2002 |
| WO | WO02065675 | 8/2002 |
| WO | WO02082689 A2 | 10/2002 |
| WO | WO02082743 A2 | 10/2002 |
| WO | 02089434 A1 | 11/2002 |
| WO | WO02093782 A1 | 11/2002 |
| WO | WO02093819 A1 | 11/2002 |
| WO | WO02100027 A1 | 12/2002 |
| WO | WO03001696 A2 | 1/2003 |
| WO | WO03001761 A1 | 1/2003 |
| WO | WO03003617 | 1/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 A1 | 9/2003 |
| WO | 03088538 A1 | 10/2003 |
| WO | WO03085876 | 10/2003 |
| WO | WO03094384 | 11/2003 |
| WO | WO03103331 | 12/2003 |
| WO | WO04002047 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | WO2004030238 | 4/2004 |
| WO | WO2004032443 A1 | 4/2004 |
| WO | 2004040825 | 5/2004 |
| WO | WO2004038954 | 5/2004 |
| WO | WO2004038972 A1 | 5/2004 |
| WO | WO2004038988 | 5/2004 |
| WO | WO2004040690 A2 | 5/2004 |
| WO | WO2004040827 | 5/2004 |
| WO | WO2004047354 | 6/2004 |
| WO | WO2004049618 A1 | 6/2004 |
| WO | WO2004051872 A2 | 6/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 A2 | 11/2004 |
| WO | WO2004098222 | 11/2004 |
| WO | WO2004102815 | 11/2004 |
| WO | WO2004102816 A2 | 11/2004 |
| WO | 2004105272 A1 | 12/2004 |
| WO | 2004114564 A1 | 12/2004 |
| WO | WO2004114549 | 12/2004 |
| WO | WO2005002253 A1 | 1/2005 |
| WO | 2005011163 A1 | 2/2005 |
| WO | 2005018270 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | 2005032004 A1 | 4/2005 |
| WO | WO2005043855 | 5/2005 |
| WO | WO2005046080 | 5/2005 |
| WO | WO2005055484 A1 | 6/2005 |
| WO | WO2005055527 | 6/2005 |
| WO | WO2005060192 A1 | 6/2005 |
| WO | WO2005065062 A2 | 7/2005 |
| WO | WO2005069538 A1 | 7/2005 |
| WO | WO2005074184 | 8/2005 |
| WO | WO2005096538 | 10/2005 |
| WO | WO2005122628 | 12/2005 |
| WO | 2006007292 A2 | 1/2006 |
| WO | WO2006019710 | 2/2006 |
| WO | WO2006026344 | 3/2006 |
| WO | WO2006044487 | 4/2006 |
| WO | 2006069301 | 6/2006 |
| WO | WO2006069300 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | WO2007024934 | 3/2007 |
| WO | WO2007024935 | 3/2007 |
| WO | WO2007025160 | 3/2007 |
| WO | WO2007051159 | 5/2007 |

OTHER PUBLICATIONS

Nokia, "Uplink Considerations for UTRA LTE", 3GPP TSG RAN WG1#40bis, Beijing, CN, R1-050251, 3GPP, Apr. 4, 2005, pp. 1-9.

NTT DoCoMo, "Downlink Multiple Access Scheme for Evolved UTRA", 3GPP R1-050249, 3GPP, Apr. 4, 2005, pp. 1-8.

Qualcomm Europe: "Description and link simulations for OFDMA based E-UTRA uplink" 3GPP Draft; R1-051100, 3rd Generation Partnership Project (3GPP), Mobile Competence Centre; 650, Route Des Luciolas; F-06921 Sophia-Antipolis Cedex; France, vol. RAN

(56) References Cited

OTHER PUBLICATIONS

WG1, No. San Diego, USA; 20051004, Oct. 4, 2005, pp. 1-10, XP050100715 [retrieved on Oct. 041, 2005.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
Schnell et al., "Application of IFDMA to Mobile Radio Transmission", IEEE 1998 International Conference on Universal Personal Communications, vol. 2, Oct. 5-9, 1998, pp. 1267-1272.
Taiwanese Search report—095142631—TIPO—Aug. 1, 2010.
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Yun et al., "Performance of an LDPC-Coded Frequency-Hopping QFDMA System Based on Resource Allocation in the Uplink" Vehicular Technology—Conference 2004. VTO 2004—Spring, 2004 IEEE 59th Milan, Italy May 17-19, 2004, Piscataway, NJ, USA, vol. 4, May 17, 2004. pp. 1925-1928. XP010766497.
3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25814 v031 (Nov. 2005), pp. 1-57.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; 20070403, Apr. 3, 2007, XP050105640 [retrieved on Apr. 3, 2007].
Bahai, Saltzberg: "System Architecture," Multi-Carrier Digital Communications, Kluwer Academic, New York, NY, XP-002199501, 1999, pp. 17-21.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Bingham: "Other Types of MCM," ADSL, VDSL, and Multicarrier Modulation, John Wiley & Sons, New York, XP-002199502. 2000, pp. 111-113.
Blum, R. et al., "On Optimum MIMO with Antenna Selection," IEEE International Conference on Communications: Conference Proceedings, vol. 1, Apr. 28, 2002, pp. 386-390.
Catreux, S. et al., "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063&punumber=7153.
Chennakeshu, et al. "Capacity Analysis of a TDMA-Based Slow-Frequency-Hopped Cellular System," IEEE Transaction on Vehicular Technology, vol. 45., No. 3, Aug. 1, 1996, pp. 531-542, XP000612951.
Choi, et al., "Design of the Optimum Pilot Pattern for Channel Estimation in OFDM Systems," Global Telecommunications Conference, IEEE Communications Society Globecom, Dallas, Texas (2004), p. 3661-3665.
Chung, S. et al., "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Das et al., "On the Reverse Link Interference Structure for Next Generation Cellular Systems," Global Telecommunications Conference, 2004. GLOBECOM '04, IEEE, vol. 5 IEEE Nov. 29-Dec. 3, 2004, pp. 3068-3072.
Dierks, et al., "The TLS Protocol", Version 1.0, Network Working Group, Request for Comments 2246, pp. 1-80 (Jan. 1999).
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Dinis, R. et al.: "A Multiple Access Scheme for the Uplink of Broadband Wireless Systems," Global Telecommunications Conference, 2004. GLOBECOM "04. IEEE Dallas, TX, USA Nov. 29-Dec. 3, 2004, vol. 6, pp. 3808-3812, XP010758449 Piscataway , NJ, USA, IEEE.
Don Torrieri, "Cellular Frequency-Hopping CDMA Systems," IEEE Vehicular Technology Conference, May 16, 1999, pp. 919-925, vol. 2.
El Gamal, H. et al., "Universal Space-Time Coding," IEEE Transactions on Information Theory, vol. 49, Issue 5, pp. 1097-1119, XP011074756, ISSN: 0018-9448, May 2003.
European Search Report—EP10184156—Search Authority—Munich—Jun. 14, 2012.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23, 2005.
Groe, J., et al., "CDMA Mobile Radio Design," Sep. 26, 2001, Artech House, Inc. Norwood, MA, pp. 257-259.
Guo, K. et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Hui Won Je et al, "A Novel Multiple Access Scheme for Uplink Cellular Systems," Vehicular Technology Conference, 2004, VTC2004—fall, 2004 IEEE 60th Los Angeles, CA, US, Sep. 26-29, 2004, Piscataway, NY, pp. 984-988.
International Search Report and Written Opinion—PCT/US06/031147, International Search Authority—European Patent Office, Feb. 2, 2007.
"Introduction to cdma2000 Standards for Spread Spectrum Systems",TIA/EIA/IS-2000 Standards for CDMA2000 Spread Spectrum Systems 3GPP2 C.S0001-0 Version 1.0, Jul. 1999, 16 pages.
John B. Groe, Lawrence E. Larson, "CDMA Mobile Radio Design" Sep. 26, 2001, Artech House, Norwood, MA02062 580530, XP002397967, pp. 157-159.

(56) References Cited

OTHER PUBLICATIONS

J.S. Chow and J.M. Cioffi: "A cost-effective maximum likelihood reciever for multicarrier systems", Proc. IEEE Int. Conf. on Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, Mar. 11, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Ken Murakami et al., "Status Toward Standardization at IEEE 802. 3ah and items on the construction of GE-PON system ," Technical Report of the Institute of Electronics, Information and Communication Engineers, Jun. 13, 2003, vol. 103, No. 124, pp. 1-6, IN2003-24.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kim, et al. "Performance of TDMA System With SFH and 2-Bit Differentially Detected GMSK Over Rayleigh Fading Channel," IEEE Vehicular Technology Conference, Apr. 28, 1996, pp. 789-794.
Kishiyama et al., Investigation of optimum pilot channel structure for VSF-OFCDM broadband wireless access in forward link, VTC 2003—Spring, The 57th IEEE Semiannual Vehicular Technology Conference, Proceedings Jeju, Korea, Apr. 22-25, 2003, pp. 139-144.
Kostic, et al. "Dynamic Frequency Hopping in Wireless Cellular Systems—Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Kousa, M. et al., "Adaptive Binary Coding for Diversity Communication Systems" IEEE International Conference on Personal Wireless Communications Proceedings, pp. 80-84, XP000992269, (1997).
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
MBFDD and MBTDD Wideband Mode: Technology Overview, IEEE C802.20-05/68r1, Jan. 6, 2006.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Molisch, et al., MIMO systems with antenna selection, IEEE Microwave Magazine, Mar. 2004, pp. 46-56, XP002411128.
Naofal Al-Dhahir: "A Bandwidth-Optimized Reduced-Complexity Equalized Multicarrier Transceiver", IEEE Transactions on Communications, vol. 45, No. 8, Aug. 1997, pp. 1-17.
Naofal Al-Dhahir: "Optimum Finite-Length Equalization for Multicarrier Transceivers", IEEE Trans. on Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Natarajan, et al., "High-Performance MC-CDMA via Carrier Interferometry Codes," IEEE Transactions on Vehicular Technology, 2001, vol. 50 (issue 6) pp. 1344-1353.
NTT DoCoMo, et al., "Orthogonal Common Pilot Channel and Scrambling Code in Evolved UTRA Downlink," 3GPP TSG RAN WG1 #42 on LTE (Original R1-050589), R1-050704, London UK, pp. 1-8, Aug. 29-Sep. 2, 2005.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Prasad, N. et al., "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM "93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell, M. et al., "A Promising New Wideband Multiple-Access Scheme for Future Mobile Communications Systems", European Transactions on Telecommunications, Jul. 1, 1999, vol. 10, No. 4, pp. 417-427, Wiley & Sons, Chichester, GB, XP009069928, ISSN: 1 124-31 8X.
Shattil et al., "Array Control Systems for Multicarrier Protocols Using a Frequency-Shifted Feedback Cavity", Radio and Wireless Conference EEE, Aug. 1-4, 1999, pp. 215-218.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/ Docs/R1-050476.zip>, May 9, 2005.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54, 104-106.
Sorger U., et al., "Interleaved FDMA—A New Spread-Spectrum Multiple-Access Scheme, XP010284733," Communications, Conference Record, IEEE, Atlanta, GA, 1998, pp. 1013-1017.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Telecommunications Industry Association, Mobile Station-Base Station Compatibility Standard for Dual-Mode Wideband Spread Spectrum Cellular System, TIA/EIA-95, Jul. 1993, 668 pages.
Tellado, "Multicarrier Modulation with Low Par," Kluwer Academic, Dordrecht, NL, XP-002199500, 2000, pp. 6-11 and 55-60.

(56) References Cited

OTHER PUBLICATIONS

Tellambura, "Use of m-sequences for OFDM Peak-to-Average Power Ratio Reduction," Electronics Letters, vol. 33, No. 15, Jul. 17, 1997, pp. 1300-1301.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, Jim: "QFDD Technology Overview Presentation," IEEE 802.20 Working Group on Mobile Broadband Wireless Access, [Online] Nov. 15, 2005, pp. 1-73, XP002467626.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Toufik, I., et al., Channel allocation algorithms for multi-carrier systems, Vehicular Technology Conference 2004, VTC2004—Fall, 2004 IEEE 60th Los Angeles, CA, USA Sep. 26-29, 2004, Piscataway, NJ, USA IEEE, Sep. 26, 2004, pp. 1129-1133, XP010786798.
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 12, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776 , WO2004098222, WO2005065062 and WO2004102815.Dated Jan. 11, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Widdup, B. et al., "A highly-parallel VLSI architecture for a list sphere detector," IEEE International Conference, Paris, France, vol. 5, pp. 2720-2725 (2004).
Wiesel, A., et al., "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Zekri, et al., "DMT Signals with Low Peak-to-Average Power Ratio," Proceedings, IEEE International Symposium on Computers and Communications, 1999, Jul. 6-8, 1999, pp. 362-368.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.
Samsung: "Uplink Transmission and Multiplexing for EUTRA", 3GPP Draft; R1-050605 UL Multiplexing, Jun. 16, 2005, XP050111420.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1 / DOCS / [retrieved on Feb. 7, 2012].

* cited by examiner

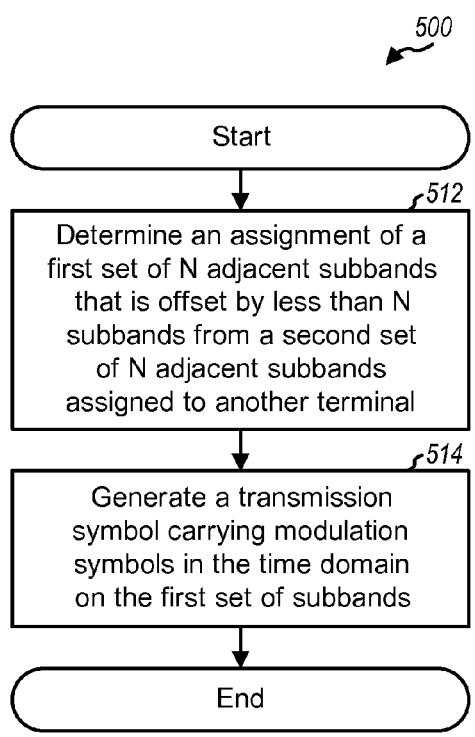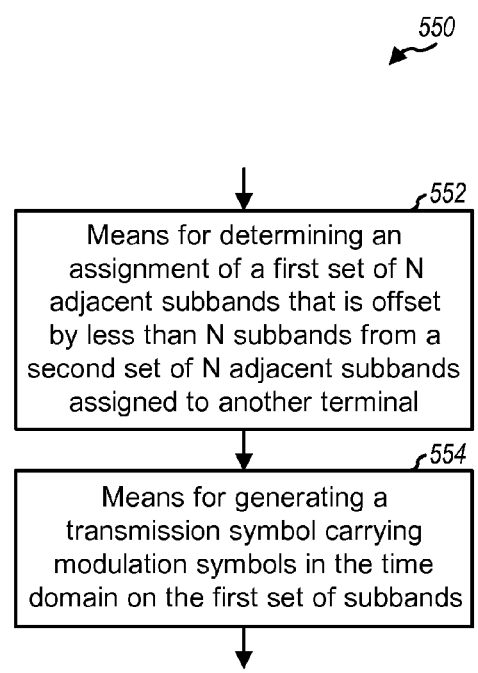
FIG. 5A
FIG. 5B

FREQUENCY DIVISION MULTIPLE ACCESS SCHEMES FOR WIRELESS COMMUNICATION

RELATED APPLICATION

The present Application for Patent is a Divisional of patent application Ser. No. 11/325,980 entitled "FREQUENCY DIVISION MULTIPLE ACCESS SCHEMES FOR WIRELESS COMMUNICATION" filed Jan. 4, 2006, pending, which claims priority to Provisional Application No. 60/738,129 entitled "FREQUENCY DIVISION MULTIPLE ACCESS SCHEMES FOR WIRELESS COMMUNICATION" filed Nov. 18, 2005, both of which are assigned to the assignee hereof and hereby expressly incorporated by reference herein.

BACKGROUND

I. Field

The present disclosure relates generally to communication, and more specifically to techniques for transmitting data in a wireless communication system.

II. Background

Orthogonal frequency division multiplexing (OFDM) is a multi-carrier multiplexing scheme that partitions a frequency band (e.g., the system bandwidth) into multiple (K) orthogonal subbands. These subbands are also called tones, subcarriers, bins, and so on. With OFDM, each subband is associated with a respective subcarrier that may be independently modulated with data.

OFDM has certain desirable characteristics such as high spectral efficiency and robustness against multipath effects. However, a major drawback with OFDM is a high peak-to-average power ratio (PAPR), which means that the ratio of the peak power to the average power of an OFDM waveform can be high. The high PAPR for the OFDM waveform results from possible in-phase addition of all the subcarriers when they are independently modulated with data. In fact, it can be shown that the peak power can be up to K times greater than the average power for OFDM.

The high PAPR for the OFDM waveform is undesirable and may degrade performance. For example, large peaks in the OFDM waveform may cause a power amplifier to operate in a highly non-linear region or possibly clip, which would then cause intermodulation distortion and other artifacts that can degrade signal quality. The degraded signal quality may adversely affect performance for channel estimation, data detection, and so on.

There is therefore a need in the art for techniques to transmit data in a manner to achieve good performance and avoid high PAPR.

SUMMARY

Techniques for transmitting data using single-carrier frequency division multiple access (SC-FDMA) multiplexing schemes to achieve good performance and low PAPR are described herein. In one aspect, data is sent on sets of adjacent subbands that are offset from one another to achieve frequency diversity. A terminal is assigned a first set of N adjacent subbands that is offset by less than N (e.g., N/2) subbands from a second set of N adjacent subbands assigned to another terminal. These terminals may be in the same or different sectors. The first set of subbands overlaps partially with the second set of subbands. A transmission symbol is generated with modulation symbols sent in the time domain on the first set of subbands. This transmission symbol observes interference from the other terminal on only subbands that are common in the first and second sets.

In another aspect, multi-carrier SC-FDMA is used to achieve frequency diversity, interference diversity, and possibly other benefits. To generate a multi-carrier transmission symbol, multiple waveforms carrying modulation symbols on multiple sets of subbands are generated. Each set may include adjacent subbands or subbands distributed across the system bandwidth. The multiple waveforms are pre-processed (e.g., cyclically delayed by different amounts) to obtain pre-processed waveforms, which are combined (e.g., added) to obtain a composite waveform. A cyclic prefix is appended to the composite waveform to generate the multi-carrier transmission symbol.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 5A shows a process to transmit data with the subband structure in FIG. 4.

FIG. 5B shows an apparatus to transmit data with the subband structure in FIG. 4.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
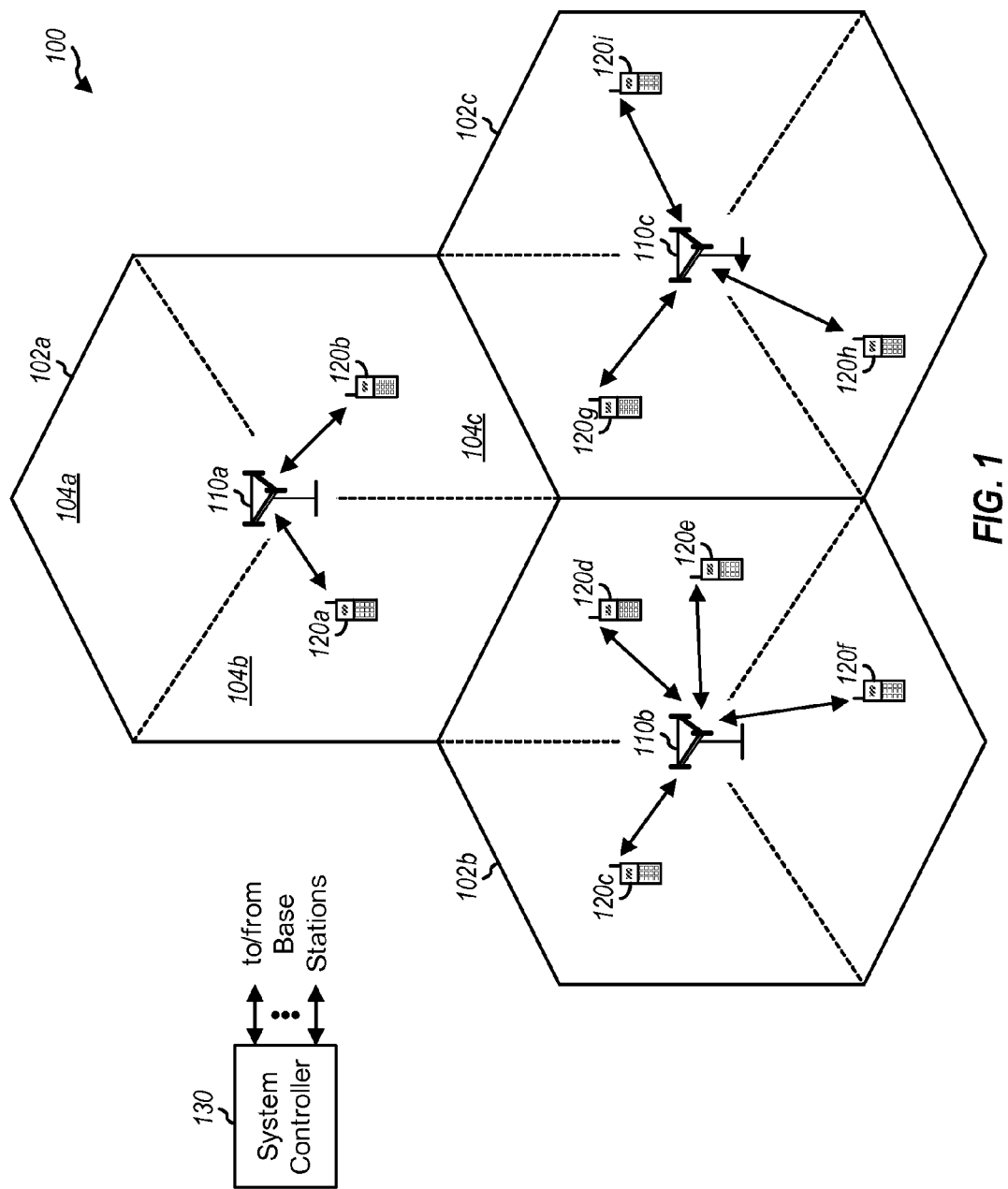
FIG. 1 shows a wireless communication system.

FIG. 1 shows a wireless communication system 100 with multiple base stations 110 and multiple terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be fixed or mobile. A terminal may also be called a mobile station, a user equipment, or some other terminology. A terminal may be a wireless device, a cellular phone, a personal digital assistant (PDA), a wireless modem card, and so on. Each terminal may communicate with one or possibly multiple base stations on the forward and reverse links at any given moment. The forward link (or downlink) refers to the communication link from the base stations to the terminals, and the reverse link (or uplink) refers to the communication link from the terminals to the base stations. In the following description, the term "terminal" and "user" are used interchangeably.

For a centralized architecture, a system controller 130 couples to base stations 110 and provides coordination and control for these base stations. For a distributed architecture, the base stations may communicate with one another as needed.

System 100 may utilize SC-FDMA, orthogonal frequency division multiple access (OFDMA), and/or some other multiplexing scheme. SC-FDMA includes (1) LFDMA which transmits data on a group of adjacent subbands, (2) IFDMA which transmits data on subbands that are distributed across the system bandwidth, (3) enhanced FDMA (EFDMA) which transmits data on multiple groups of adjacent subbands, (4) multi-carrier SC-FDMA which transmits data on multiple sets of subbands, or (5) other variants of SC-FDMA. LFDMA is also called narrowband FDMA, classical FDMA, and FDMA. IFDMA is also called distributed FDMA. OFDM utilizes OFDM. In general, modulation symbols are sent in the time domain with SC-FDMA and in the frequency domain with OFDM.

In general, system 100 may utilize one or more multiplexing schemes for the forward and reverse links. For example, system 100 may utilize (1) SC-FDMA (e.g., LFDMA) for both the forward and reverse links (2) one version of SC-FDMA (e.g., LFDMA) for one link and another version of SC-FDMA (e.g., IFDMA) for the other link, (3) SC-FDMA for the reverse link and OFDMA for the forward link, or (4) some other combination of multiplexing schemes. SC-FDMA, OFDMA, some other multiplexing scheme, or a combination thereof may be used for each link to achieve the desired performance. For example, SC-FDMA and OFDMA may be used for a given link, with SC-FDMA being used for some subbands and OFDMA being used for other subbands. It may be desirable to use SC-FDMA on the reverse link to achieve lower PAPR and to relax power amplifier requirements for the terminals. It may be desirable to use OFDMA on the forward link to potentially achieve higher system capacity.

Figure 2A:
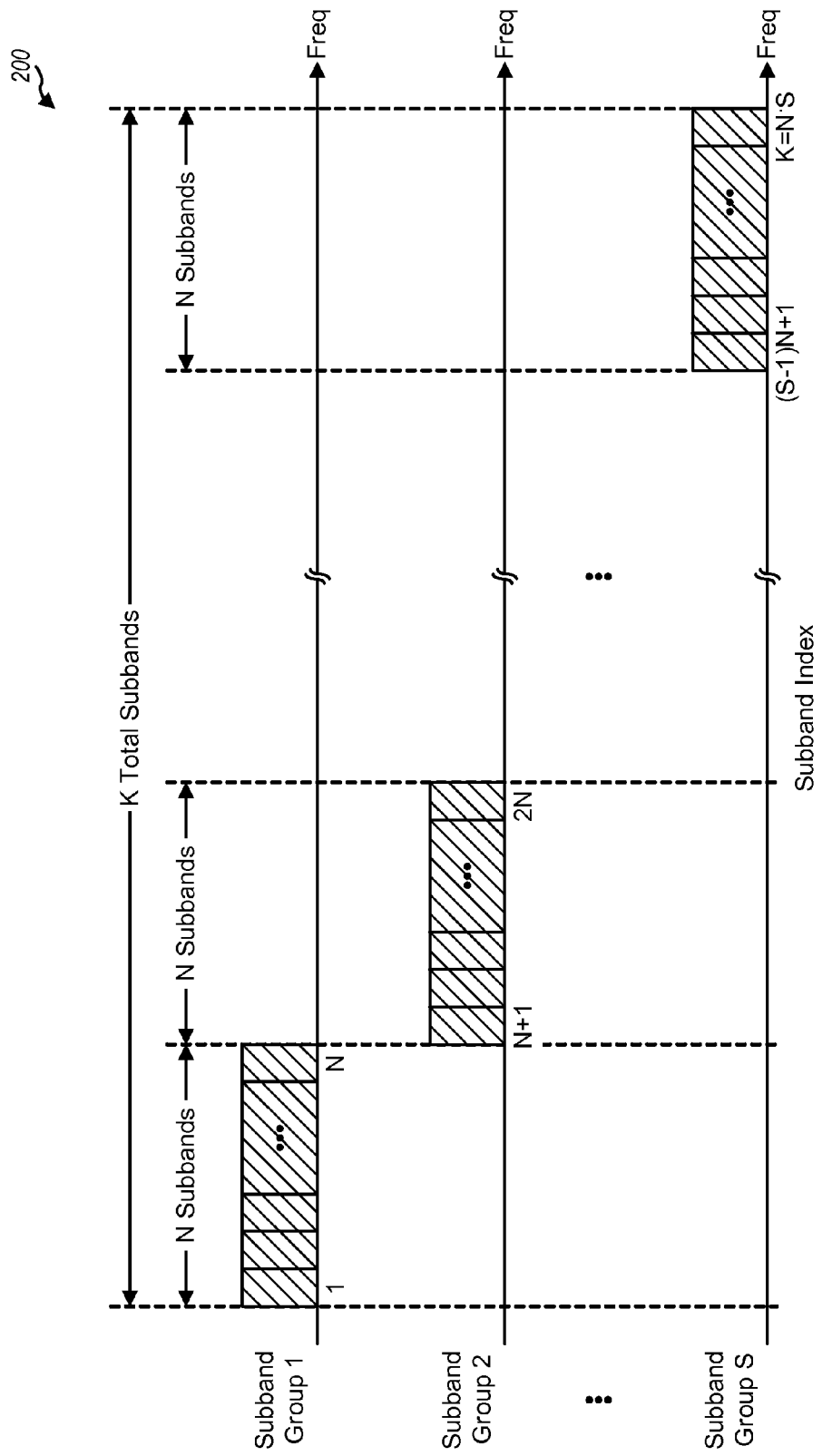
FIG. 2A shows a subband structure for localized FDMA (LFDMA).

FIG. 2A shows an exemplary subband structure 200 for LFDMA. The overall system bandwidth of BW MHz is partitioned into multiple (K) orthogonal subbands that are given indices of 1 through K, where K may be any integer value but is typically a power of two. For simplicity, the following description assumes that all K total subbands are usable for transmission. The spacing between adjacent subbands is BW/K MHz. For subband structure 200, the K total subbands are arranged into S non-overlapping groups. The S groups are non-overlapping or disjoint in that each of the K subbands belongs in only one group. Each group contains N adjacent subbands, and group g contains subbands $(g-1)\cdot N+1$ through $g\cdot N$, where $K=S\cdot N$ and $g\in\{1,\ldots,S\}$.

Figure 2B:
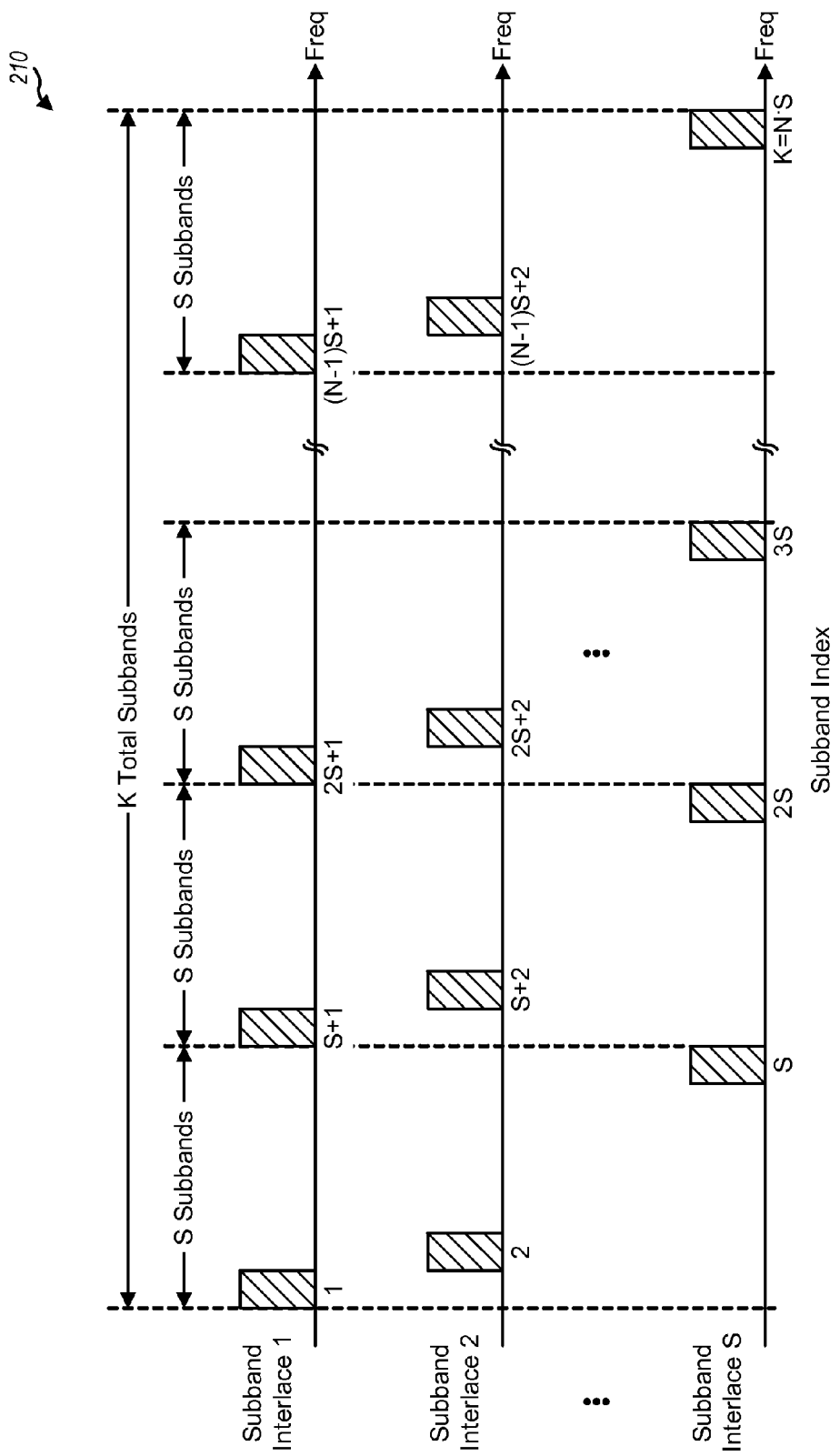
FIG. 2B shows a subband structure for interleaved FDMA (IFDMA).

FIG. 2B shows an exemplary subband structure 210 for IFDMA. For subband structure 210, the K total subbands are arranged into S non-overlapping interlaces. Each interlace contains N subbands that are uniformly distributed across the K total subbands, and consecutive subbands in each interlace are spaced apart by S subbands. Interlace u contains subband u as the first subband, where $K=S\cdot N$ and $u\in\{1,\ldots,S\}$.

An exemplary subband structure for EFDMA may be defined as follows. The K total subbands are arranged into S non-overlapping sets. Each set contains L groups that are spaced apart by P subbands, and each group includes M adjacent subbands, where $P=K/L$. Each set thus contains a total of $N=L\cdot M$ subbands that are arranged into L groups of M adjacent subbands, with the subband groups being uniformly distributed across the system bandwidth.

In general, a subband structure may include any number of non-overlapping subband sets. Each subband set may contain any number of subbands and any one of the K total subbands. The subband sets may contain the same or different numbers of subbands. For each set, the subbands in the set may be adjacent to one another as shown in FIG. 2A, uniformly distributed across the system bandwidth as shown in FIG. 2B, non-uniformly distributed across the system bandwidth, or arranged in multiple groups that may be uniformly or non-uniformly distributed across the system bandwidth. For example, each subband set may correspond to a subband group in FIG. 2A, an interlace in FIG. 2B, or multiple groups of subbands for the EFDMA subband structure described above. Furthermore, N, S, L and M may or may not be integer divisors of K. Different users may be assigned different subband sets and would then be orthogonal to one another.

Figure 3A:
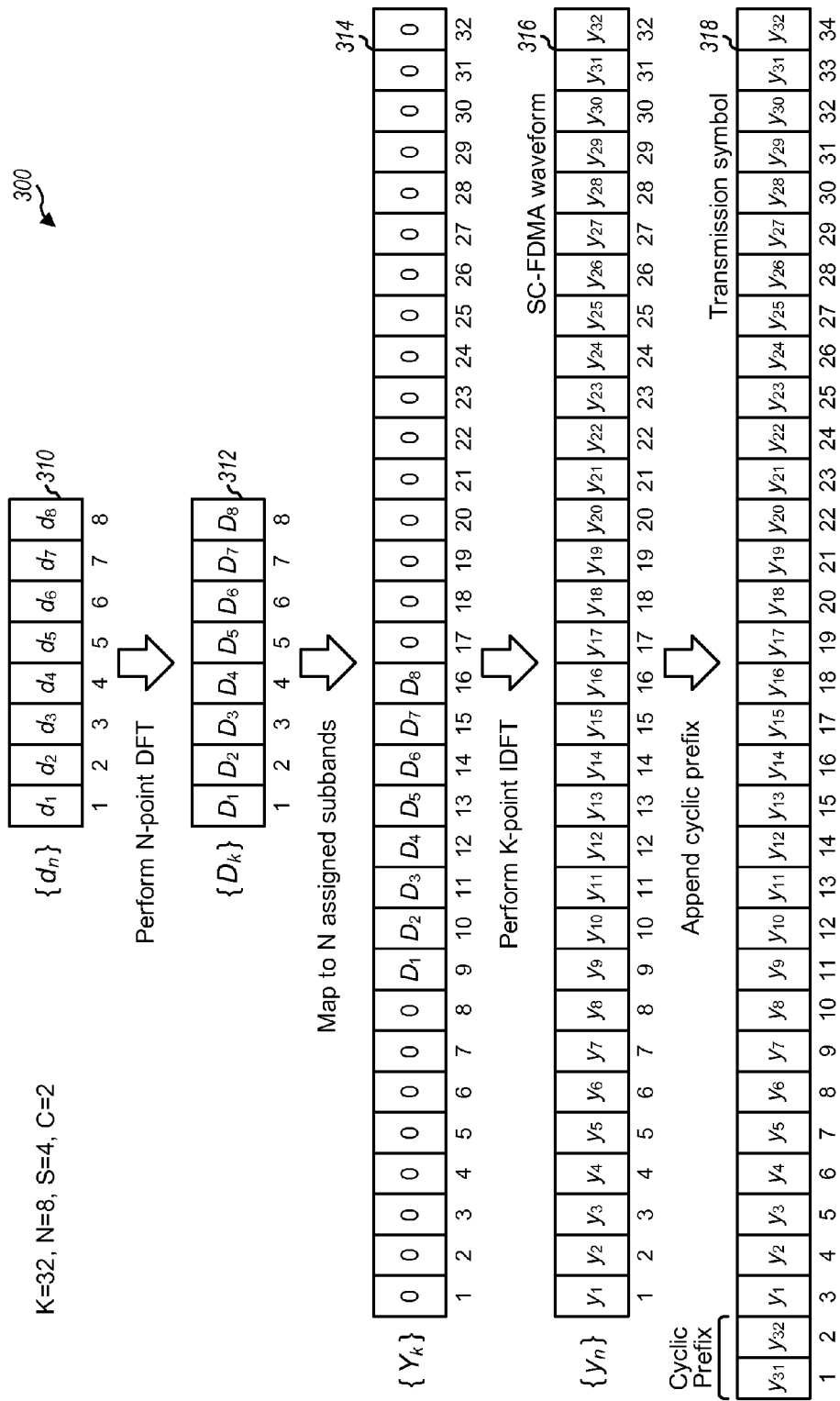
FIGS. 3A and 3B show two processes for generating a transmission symbol.

FIG. 3A shows a process 300 for generating a transmission symbol for a subband set, e.g., a subband group or an interlace. For clarity, FIG. 3A shows a simple case with K=32 total subbands, N=8 subbands in each set, and a cyclic prefix length of C=2.

An original sequence of N modulation symbols to be transmitted in one symbol period on one subband set is denoted as $\{d_n\}=\{d_1, d_2, \ldots, d_N\}$ (block 310). Sequence $\{d_n\}$ is transformed to the frequency domain with an N-point discrete Fourier transform (DFT) or an N-point fast Fourier transform (FFT) to obtain a sequence of N frequency-domain values, $\{D_k\}=\{D_1, D_2, \ldots, D_N\}$ (block 312). The N frequency-domain values are mapped to the N subbands in the set used for transmission. These N assigned subbands have indices of $U+1, U+2, \ldots, U+N$, where U is a start offset for the assigned subbands, and U=8 for the example shown in FIG. 3A. Zero values are mapped to the remaining K−N subbands to generate a sequence of K values, $\{Y_k\}$ (block 314). Sequence $\{Y_k\}$ is then transformed to the time domain with a K-point inverse discrete Fourier transform (IDFT) or a K-point inverse fast Fourier transform (IFFT) to obtain a sequence of K time-domain output samples, $\{y_n\}$, which is also called an SC-FDMA waveform (block 316).

The last C output samples in sequence $\{y_n\}$ are copied to the start of the sequence to form a transmission symbol that contains K+C output samples (block 318). The C copied output samples are often called a cyclic prefix or a guard interval, and C is the cyclic prefix length. The cyclic prefix is used to combat intersymbol interference (ISI) caused by frequency selective fading, which is a frequency response that varies across the system bandwidth. The K+C output samples of the transmission symbol are transmitted in K+C sample periods, one output sample in each sample period. A symbol period is the duration of one transmission symbol and is equal to K+C sample periods. A sample period is also called a chip period.

Figure 3B:
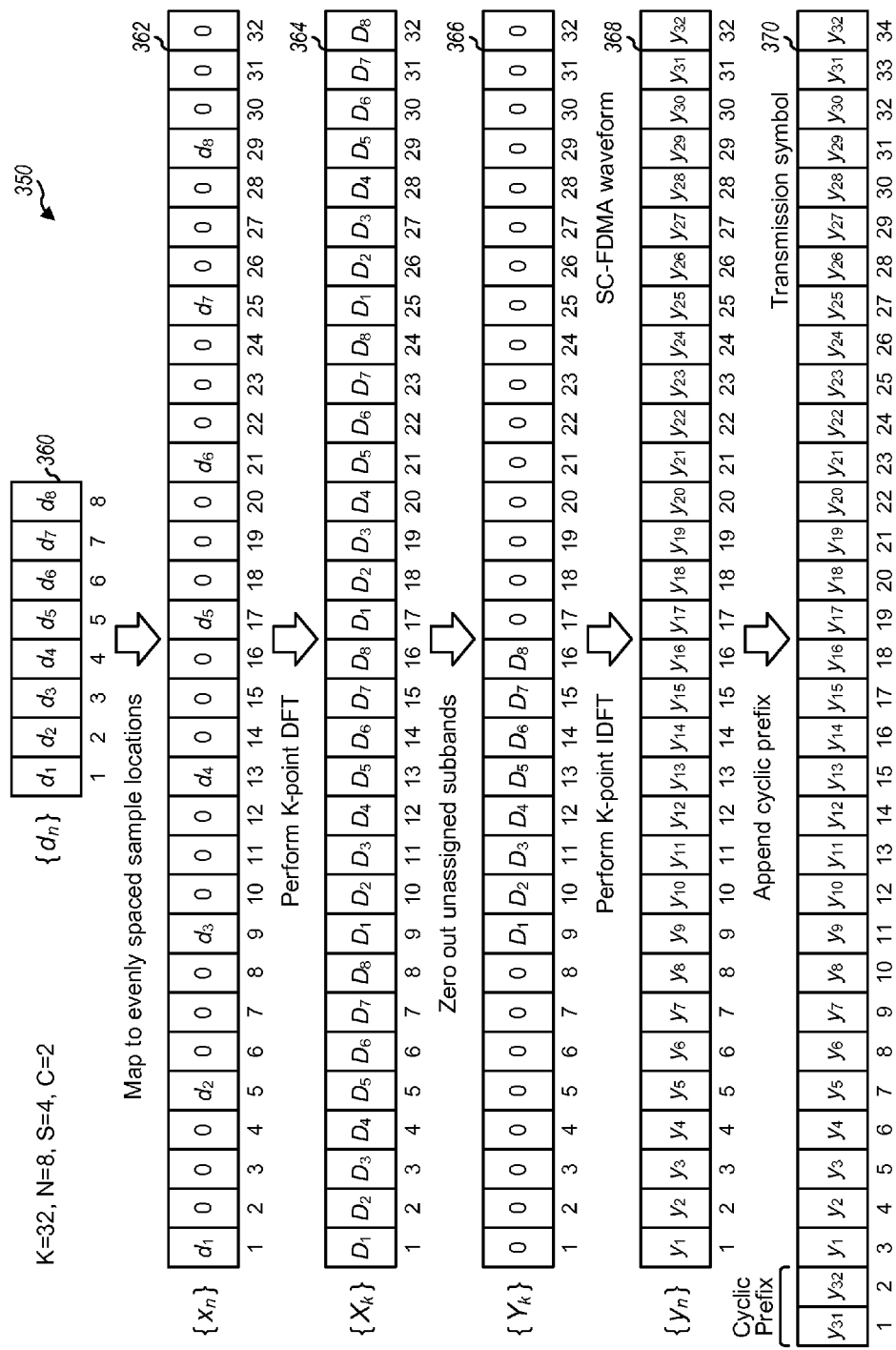

FIG. 3B shows another process 350 for generating a transmission symbol for a subband set. For clarity, FIG. 3B also shows a simple case with K=32, N=8 and C=2. An original sequence of N modulation symbols to be transmitted in one symbol period on one subband set is denoted as $\{d_n\} = \{d_1, d_2, \ldots, d_N\}$ (block 360). The N modulation symbols are mapped to a sequence $\{x_n\}$ with K total sample locations that are given indices of 1 through K (block 362). The N modulation symbols are mapped to N evenly spaced sample locations 1, S, 2S, ..., (N−1)·S in sequence $\{x_n\}$, are uniformly distributed across sequence $\{x_n\}$, and are spaced apart by S sample locations. Zero values are mapped to the K·N remaining sample locations in sequence $\{x_n\}$.

Sequence $\{x_n\}$ is then transformed to the frequency domain with a K-point DFT/FFT to obtain a sequence of K frequency-domain values, $\{X_k\}$ (block 364). N frequency-domain values for the N assigned subbands with indices of U+1 through U+N are retained, and the remaining K−N unassigned subbands are filled with zeros to form a sequence of K values, $\{Y_k\}$ (block 366). Sequence $\{Y_k\}$ is then transformed to the time domain with a K-point IDFT/IFFT to obtain a sequence of K time-domain samples, $\{y_n\}$ (block 368). The last C output samples in sequence $\{y_n\}$ are copied to the start of the sequence to form a transmission symbol that contains K+C output samples (block 370).

Process 300 may also be used to generate transmission symbols for IFDMA and EFDMA. The N frequency-domain values in sequence $\{D_k\}$ are mapped to the N assigned subbands, which may be for an interlace for IFDMA or multiple groups of subbands for EFDMA. Transmission symbols for LFDMA, IFDMA and EFDMA may also be generated in other manners.

S subband sets may be defined for LFDMA as shown in FIG. 2A, and neighboring sectors may use the same S subband sets. For this LFDMA scheme, a user $u_1$ that is assigned subband set s in a sector observes interference from another user $u_2$ that is assigned the same subband set s in a neighbor sector. Furthermore, user $u_1$ observes interference from user $u_2$ on all N subbands in set s.

In an aspect, S subband sets are defined for each sector, and different subband sets are defined for neighboring sectors. The subband sets may be defined such that a subband set for a given sector may overlap partially but not completely with a subband set for a neighbor sector. Hence, no subband set for a given sector contains all of the subbands in any subband set for a neighbor sector. For this LFDMA scheme, a user $u_1$ that is assigned subband set s in a sector may observe interference from another user $u_2$ in a neighbor sector on some but not all of the subbands in set s. This LFDMA scheme provides interference diversity since user $u_1$ does not observe interference from a single user in another sector across all of the subbands assigned to user $u_1$.

Figure 4:
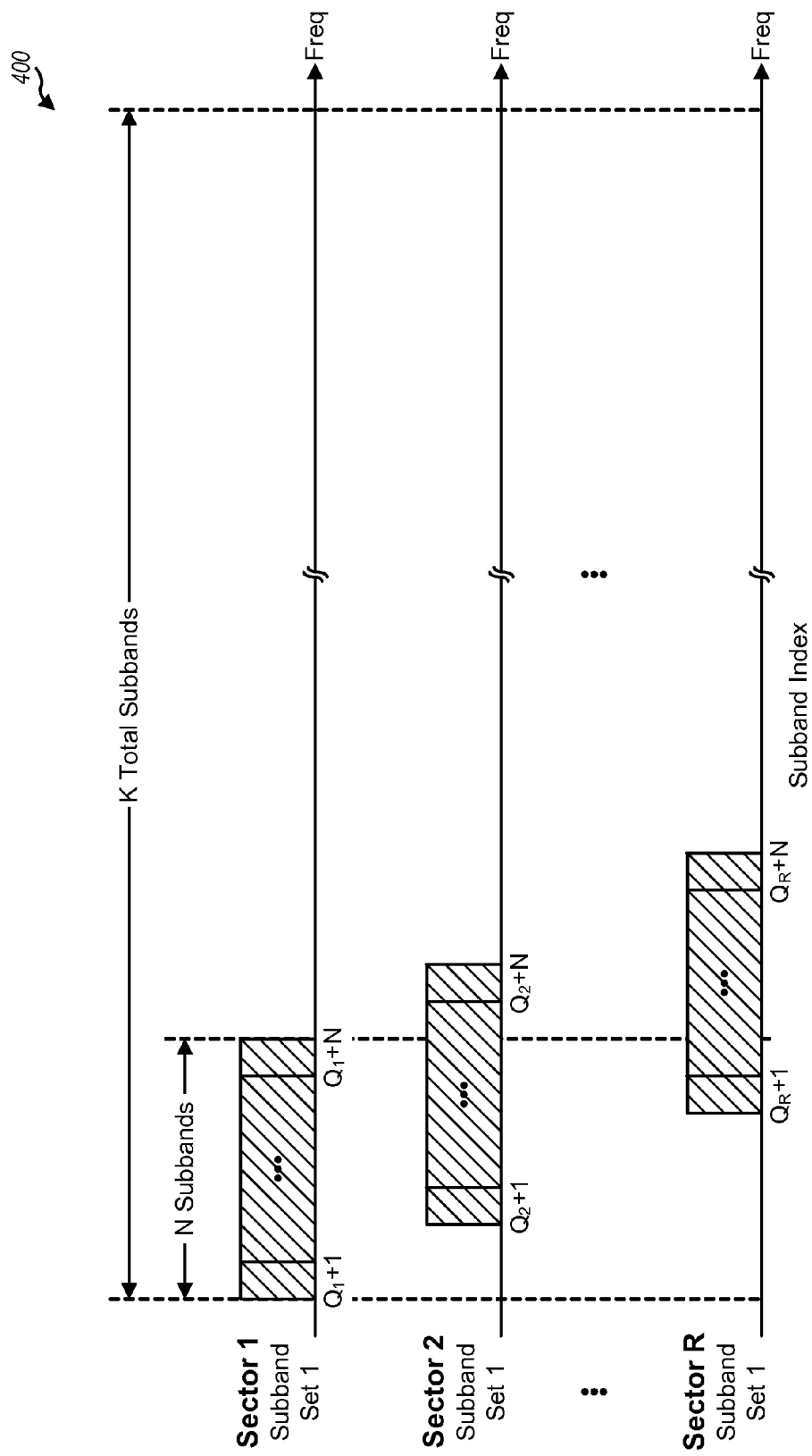
FIG. 4 shows a subband structure that can provide interference diversity.

FIG. 4 shows an exemplary LFDMA subband structure 400 that can provide interference diversity. For simplicity, FIG. 4 shows only subband set 1 for each of R sectors, where R may be any integer value. For each sector i, where i∈{1, ... R}, subband set 1 contains subbands $Q_i+1$ through $Q_i+N$, subband set 2 contains subbands $Q_i+N+1$ through $Q_i+2N$, and so on, and subband set S may contain subbands 1 through $Q_i$ and subbands $Q_i+(S-1)·N+1$ through K, where $Q_i$ may be any integer value between 0 and N−1. For each sector i, the S subband sets are shifted versions of the S subband groups shown in FIG. 2A. The last subband set may include subbands at one or both band edges.

The R sectors may be assigned R different offsets so that $Q_1 \ne Q_2 \ne \ldots \ne Q_N$. Each subband set for a given sector may then include some but not all of the subbands in any subband set for a neighbor sector. As an example, for R=2, the offsets for the two sectors may be defined as $Q_1=0$ and $Q_2=N/2$. The subband sets for one sector are then offset by N/2 subbands from the subband sets for the other sector, and any two subband sets for the two sectors overlap by at most N/2 subbands. As another example, for R=4, the offsets for the four sectors may be defined as $Q_1=0$, $Q_2=N/4$, $Q_3=N/2$ and $Q_4=3N/4$. Any two subband sets for any two sectors would then overlap by at most 3N/4 subbands. For any given value of R, the offset for each sector i, for i=1, ... R, may be defined as $Q_i = \lfloor (i-1) \cdot N/R \rfloor$, where "$\lfloor \alpha \rfloor$" is a floor operator that gives the largest integer value that is equal to or less than $\alpha$. In general, the offsets for the R sectors may be any values and do not need to be a power of two or evenly spaced.

For subband structure 400, a user $u_1$ assigned with subband set 1 in sector 1 would overlap partially with users $u_{2a}$ through $u_{Ra}$ assigned with subband set 1 in sectors 2 through R, respectively. User $u_1$ would then observe interference on the subbands that user $u_1$ shares with each of users $u_{2a}$ through $u_{Ra}$. User $u_1$ would also overlap partially with user $u_{2b}$ assigned with subbands 1 through $Q_2$ in sector 2, user $u_{3b}$ assigned with subbands 1 through $Q_3$ in sector 3, and so on, and user $u_{Rb}$ assigned with subbands 1 through $Q_R$ in sector R. User $u_1$ would also observe interference from users $u_{2b}$ through $u_{Rb}$ on these subbands. User $u_1$ may thus observe interference from two users in each neighbor sector.

Subband structure 400 may also be used to support quasi-orthogonal multiplexing for a single sector. Multiple channel sets may be defined for the sector. Each channel set i may include S subband sets that are formed with a different offset $Q_i$. Subband set v for a given channel set would then overlap partially with subband set v for each of the other channel set(s). The S subband sets in channel set 1 may be assigned to users first, then the S subband sets in channel set 2 may be assigned to users if and as necessary, and so on. With quasi-orthogonal multiplexing, multiple users in the same sector may share a given subband. The transmissions for these overlapping users would interfere with one another and may be separated using receiver spatial processing techniques. With subband structure 400, a user in a given channel set observes interference from more users in the other channel set(s), which provides interference diversity.

A transmission symbol for a subband set with offset $Q_i$ may be generated using process 300 in FIG. 3A, process 350 in FIG. 3B, or some other construction process. For process 300, the N frequency-domain values in sequence $\{D_k\}$ may be mapped directly to the N assigned subbands. For process 350, the N frequency-domain values in sequence $\{X_k\}$ for the N assigned subbands are retained, and the remaining subbands are filled with zeros to obtain sequence $\{Y_k\}$. Process 300 and process 350 provide the same output sequence $\{y_n\}$ when the start offset U for the assigned subbands is an integer multiple of N.

When U is not an integer multiple of N, which is the case if $Q_i$ is a non-zero value, the output sequence $\{y_n\}$ provided by process 350 is comparable but not identical to the output sequence $\{y_n\}$ provided by process 300. As shown in FIG. 3B, sequence $\{X_k\}$ is periodic in the frequency domain with a periodicity of N. When U is an integer multiple of N, sequence $\{Y_k\}$ contains the N frequency-domain values $\{D_1, \ldots, D_N\}$ in the same order as sequence $\{D_k\}$. However, when U is not an integer multiple of N, sequence $\{Y_k\}$ contains a different ordering of the N frequency-domain values in sequence $\{D_k\}$. For example, if $Q_i=N/2$ and U=N/2 for subband set 1, then sequence $\{Y_k\}$ contains $\{D_{N/2+1}, \ldots, D_N, D_1, \ldots D_{N/2}\}$. A receiver would process a received transmission symbol to obtain estimates of $\{D_{N/2+1}, \ldots, D_N, D_1, \ldots D_{N/2}\}$ and would reorder these estimates to obtain $\{D_1, \ldots, D_N\}$. The receiver would then perform an N-point IDFT/IFFT on the estimates of $\{D_1, \ldots, D_N\}$ to obtain estimates of the modulation symbols $\{d_1, \ldots, d_N\}$.

FIG. 5A shows a process 500 performed by a transmitter (e.g., a base station or a terminal) to transmit data with subband structure 400 in FIG. 4. Initially, a subband assignment for the terminal is determined (block 512). This subband assignment is for a first set of N adjacent subbands that is offset by less than N subbands from a second set of N adjacent subbands assigned to another terminal. For example, the first and second subband sets may be offset by N/2 subbands from each other. The two terminals may be in the same or different sectors. A transmission symbol carrying modulation symbols sent in the time domain on the first set of subbands is generated, e.g., based on process 300 in FIG. 3A or process 350 in FIG. 3B (block 514).

FIG. 5B shows an apparatus 550 for transmitting data with subband structure 400 in FIG. 4. Apparatus 550 includes means for determining a subband assignment for a terminal, which is for a first set of N adjacent subbands that is offset by less than N subbands from a second set of N adjacent subbands assigned to another terminal (block 552), and means for generating a transmission symbol carrying modulation symbols sent in the time domain on the first set of subbands (block 554).

A transmission symbol may be generated for a single subband set, e.g., a subband group or an interlace, as described above. The transmission symbol carries modulation symbols in the time domain and has a low PAPR that is comparable to the PAPR of a single-carrier system. This is in contrast to OFDM, which transmits modulation symbols in the frequency domain and has a high PAPR.

In another aspect, a multi-carrier transmission symbol is generated for multiple subband sets, e.g., multiple subband groups or multiple interlaces, using multi-carrier SC-FDMA. Multi-carrier SC-FDMA may provide frequency diversity, interference diversity, and possibly other benefits.

Figure 6:
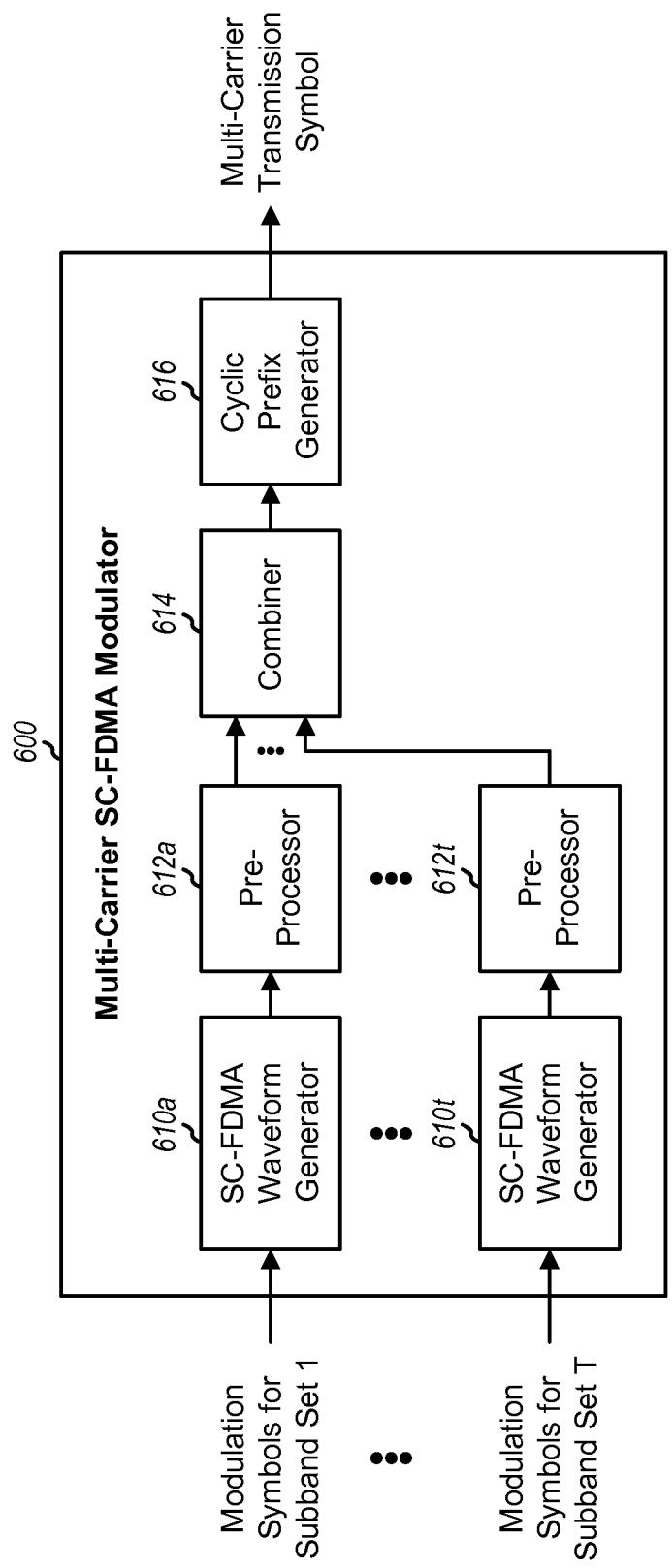
FIG. 6 shows a multi-carrier SC-FDMA modulator.

FIG. 6 shows an embodiment of a multi-carrier SC-FDMA modulator 600 that can generate a multi-carrier transmission symbol for multiple (T) subband sets. Within modulator 600, T SC-FDMA waveform generators 610a through 610t receive T sets of modulation symbols for T subband sets. Each SC-FDMA waveform generator 610 performs modulation (e.g., for LFDMA or IFDMA) on its set of modulation symbols for its subband set and generates a corresponding SC-FDMA waveform. For example, each SC-FDMA waveform generator 610 may perform process 300 in FIG. 3A or process 350 in FIG. 3B to generate an output sequence $\{y_n\}$, which is provided as the SC-FDMA waveform. SC-FDMA waveform generators 610a through 610t independently generate T SC-FDMA waveforms for T subband sets.

In an embodiment, the T SC-FDMA waveforms are combined (e.g., added) to generate a composite waveform, and a cyclic prefix is appended to the composite waveform to generate a multi-carrier transmission symbol. This multi-carrier transmission symbol would have a higher PAPR than a transmission symbol generated for a single subband set.

In another embodiment, the T SC-FDMA waveforms are pre-processed prior to being combined to achieve a lower PAPR. As shown in FIG. 6, T pre-processors 612a through 612t receive the T SC-FDMA waveforms from T generators 610a through 610t, respectively. Each pre-processor 612 performs pre-processing on its SC-FDMA waveform and provides a pre-processed SC-FDMA waveform. A combiner 614 receives and combines (e.g., adds) the T pre-processed SC-FDMA waveforms from pre-processors 612a through 612t and provides a composite waveform. A cyclic prefix generator 616 appends a cyclic prefix to the composite waveform and provides a multi-carrier transmission symbol.

The pre-processing on the SC-FDMA waveforms may be performed in various manners. The pre-processing may be the same or different for LFDMA, IFDMA and EFDMA.

Figure 7:
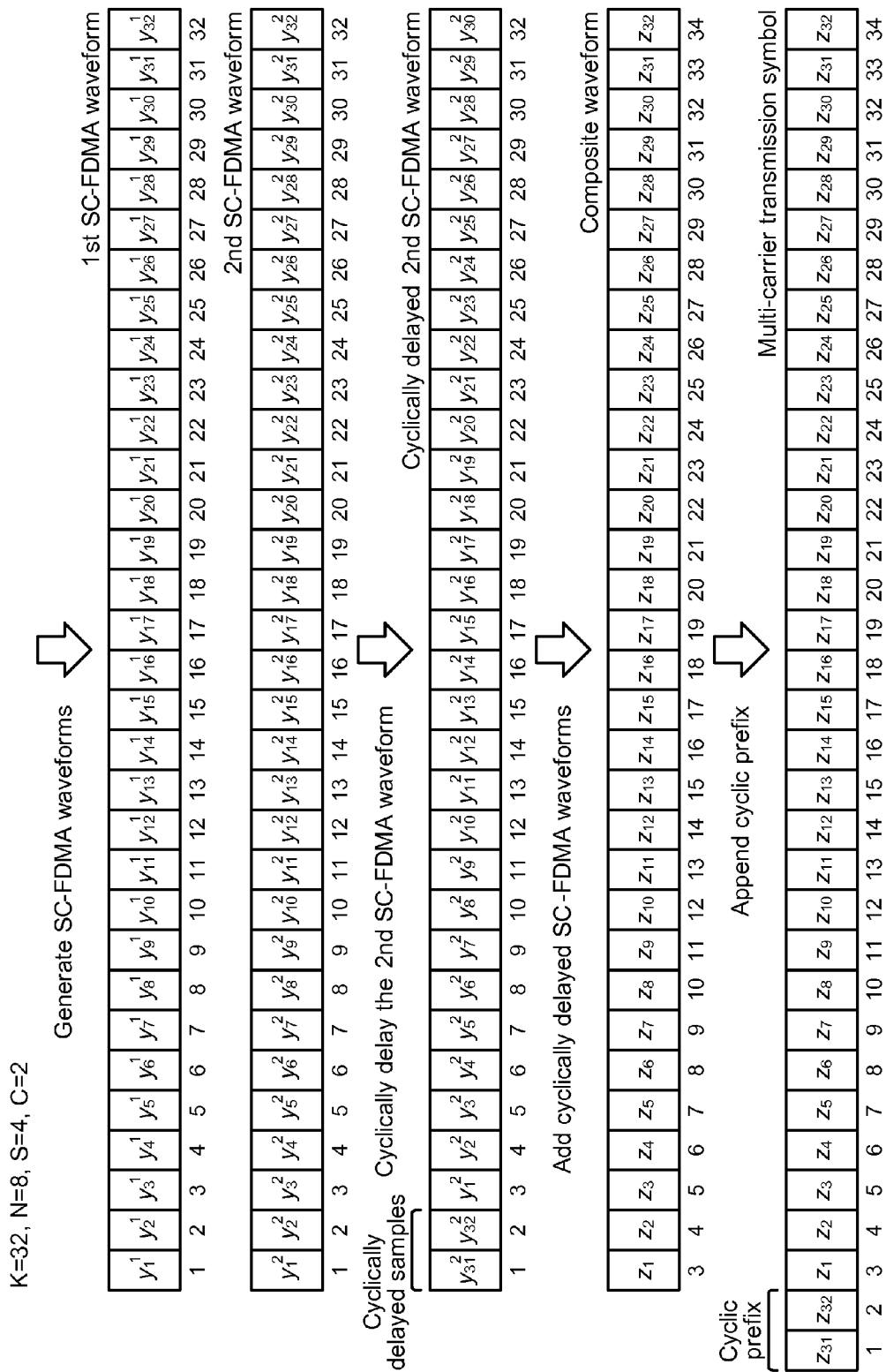
FIG. 7 shows generation of a multi-carrier transmission symbol with cyclically delayed SC-FDMA waveforms.

FIG. 7 shows an embodiment in which the SC-FDMA waveforms are cyclically delayed prior to combining. For this embodiment, each pre-processor 612 cyclically delays or circularly shifts its SC-FDMA waveform by a predetermined amount to generate a pre-processed SC-FDMA waveform. For the example shown in FIG. 7, T=2, and two SC-FDMA waveforms are combined. Pre-processor 612a provides a cyclic delay of zero samples and simply passes its input SC-FDMA waveform as the pre-processed SC-FDMA waveform. Pre-processor 612t provides a cyclic delay of S/2 samples and outputs the cyclically delayed SC-FDMA waveform as the pre-processed SC-FDMA waveform. The two cyclically delayed SC-FDMA waveforms are added and appended with a cyclic prefix to generate the multi-carrier transmission symbol.

T pre-processors 612a through 612t may provide different cyclic delays for the T SC-FDMA waveforms. The cyclic delay for each SC-FDMA waveform may also be achieved in the frequency domain by applying a phase ramp across the corresponding sequence of frequency-domain values, $\{Y_k\}$. The cyclic delay shifts the energy peaks in the SC-FDMA waveforms prior to combining these waveforms. The cyclic delay is particularly effective at reducing PAPR for a multi-carrier SC-FDMA waveform generated for multiple subband groups for LFDMA. Furthermore, the cyclic delay does not distort or alter the characteristics of the input SC-FDMA waveforms, which may be desirable.

In another embodiment, pre-processors 612a through 612t implement a set of filters. The filters may be lowpass filters, all-pass filters, and/or some other types of filters. The filters may be fixed filters designed to provide a lower PAPR on average for multi-carrier transmission symbols. These filters may also be selected based on the input SC-FDMA waveforms from generators 610a through 610t. For example, multiple sets of filters may be defined, and the set of filters that provides the lowest PAPR may be selected for use. The selected set of filters may be signaled to the receiver, which may then apply a complementary set of filters on the received transmission symbol. Alternatively, the receiver may not be informed of the selected set of filters and may attempt to decode the received transmission symbol with each of the possible sets of filters. If pilot and data symbols are sent using the same set of filters, then the receiver may use the pilot symbols to estimate the effective channel response, which includes the wireless channel response and the selected set of filters. The receiver may then process the received transmission symbol with the effective channel response estimate. The receiver may not need to determine the set of filters used to send the pilot and data symbols.

Figures 8A, 8B:
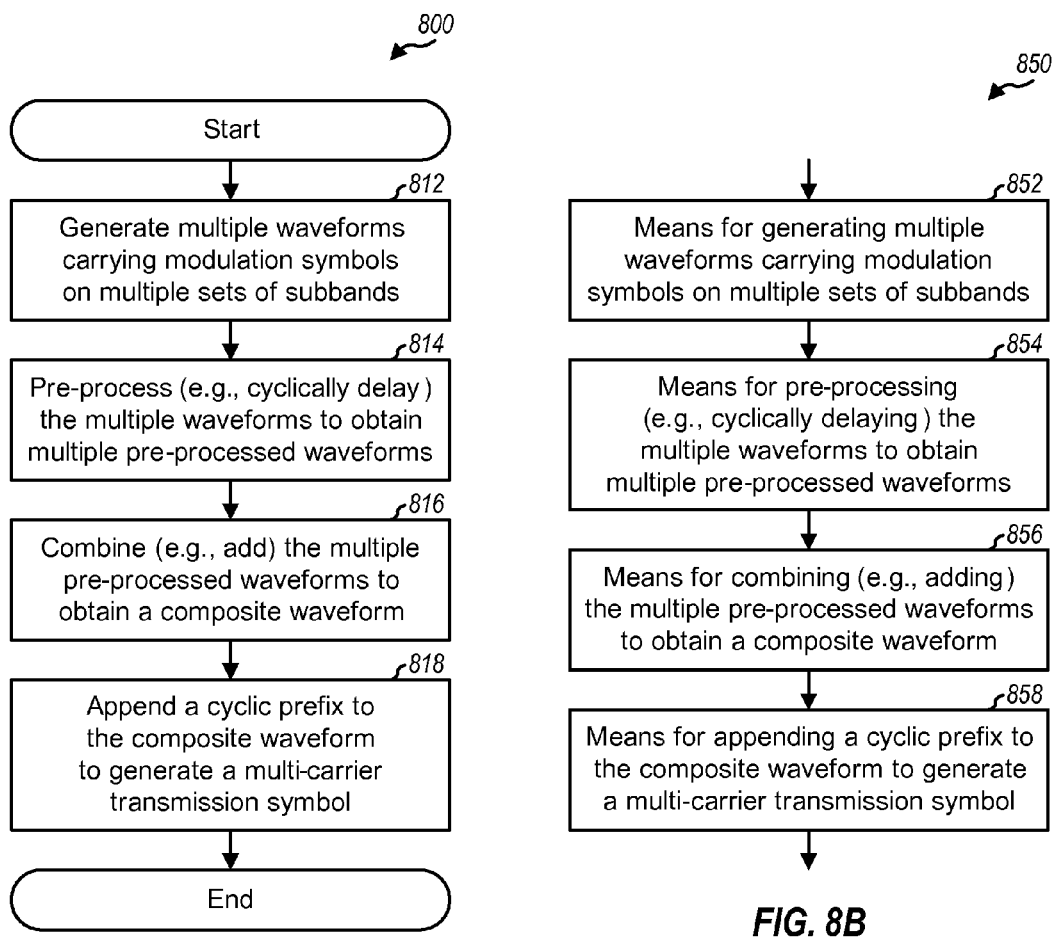
FIG. 8A shows a process to generate a multi-carrier transmission symbol.
FIG. 8B shows an apparatus to generate a multi-carrier transmission symbol.

FIG. 8A shows a process 800 performed by a transmitter to generate a multi-carrier transmission symbol. Multiple waveforms carrying modulation symbols in the time domain on multiple sets of subbands are generated (block 812). The multiple sets may include adjacent subbands for LFDMA, uniformly distributed subbands for IFDMA, or multiple groups of subbands for EFDMA. The multiple waveforms are pre-processed to obtain multiple pre-processed waveforms (block 814). The pre-processing may entail cyclically delaying the multiple waveforms by different amounts, e.g., by 0 and K/2N samples for two waveforms. Alternatively, the pre-processing may entail filtering the multiple waveforms with a set of filter(s), which may be selected to achieve a low PAPR for the resultant transmission symbol. The multiple pre-processed waveforms are combined (e.g., added) to obtain a composite waveform (block 816). A cyclic prefix is then appended to the composite waveform to generate the multi-carrier transmission symbol (block 818).

FIG. 8B shows an apparatus 850 for generating a multi-carrier transmission symbol. Apparatus 850 includes means for generating multiple waveforms carrying modulation symbols in the time domain on multiple sets of subbands (block 852), means for pre-processing (e.g., cyclically delaying or filtering) the multiple waveforms to obtain multiple pre-processed waveforms (block 854), means for combining (e.g., adding) the multiple pre-processed waveforms to obtain a composite waveform (block 856), and means for appending a cyclic prefix to the composite waveform to generate the multi-carrier transmission symbol (block 858).

Figures 9A, 9B:
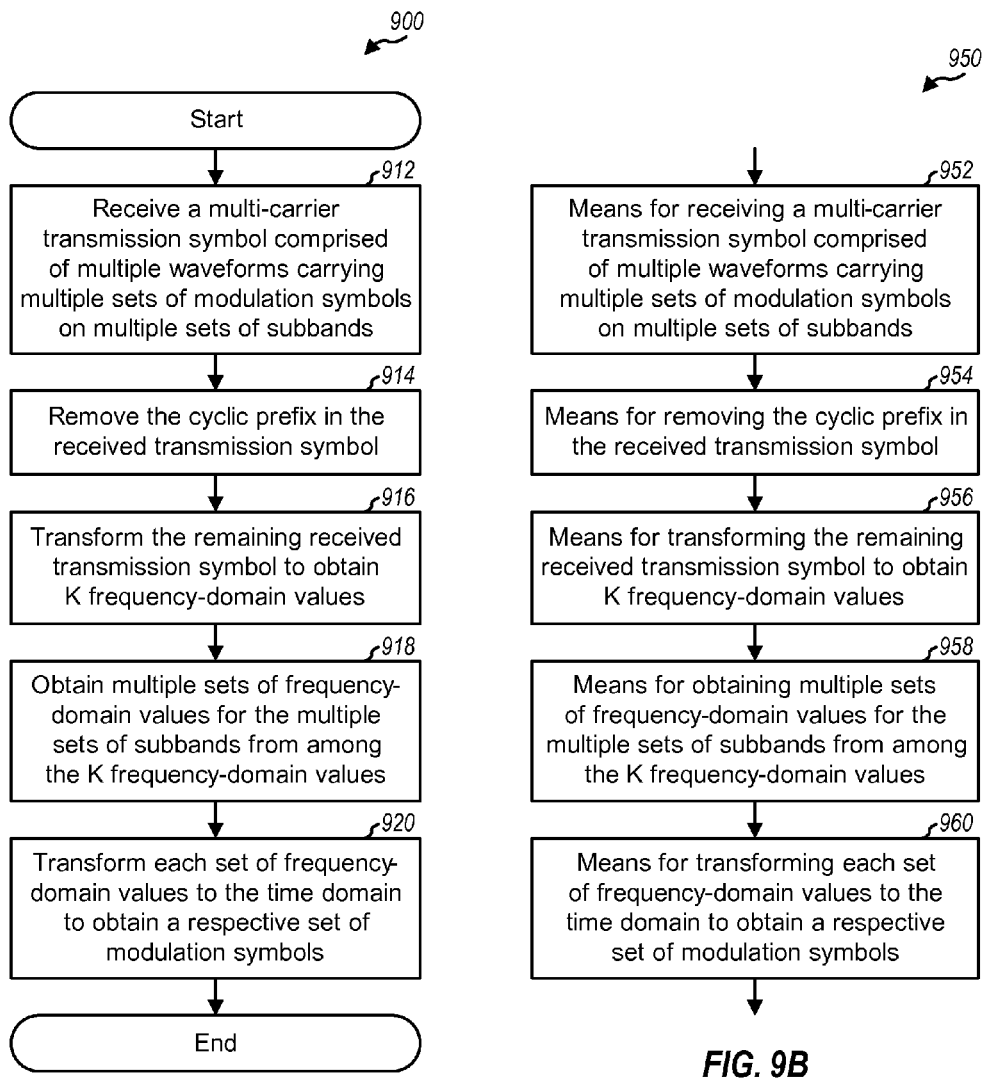
FIG. 9A shows a process to receive a multi-carrier transmission symbol.
FIG. 9B shows an apparatus to receive a multi-carrier transmission symbol.

FIG. 9A shows a process 900 performed by a receiver. A multi-carrier transmission symbol comprised of multiple waveforms carrying multiple sets of modulation symbols in the time domain on multiple sets of subbands is initially received (block 912). The cyclic prefix is removed from the received transmission symbol (block 914). The remaining received transmission symbol is transformed to the frequency domain (e.g., with a K-point DFT/FFT) to obtain K frequency-domain values (block 916). Multiple sets of frequency-domain values for the multiple sets of subbands are obtained from among the K frequency-domain values (block 918). Each set of frequency-domain values is transformed to the time domain (e.g., with an N-point IDFT/IFFT) to obtain a respective set of modulation symbols sent in the multi-carrier transmission symbol (block 920).

If the multiple waveforms are cyclically delayed by different amounts prior to combining at the transmitter, then the receiver does not need to perform any special processing to remove the cyclic delays. If the multiple waveforms are filtered with a set of filters at the transmitter, then the receiver may perform equalization for this set of filters. The receiver may also perform data detection with a channel estimate obtained based on pilot symbols sent using the same set of filters.

FIG. 9B shows an apparatus 950 for receiving a multi-carrier transmission symbol. Apparatus 950 includes means for receiving a multi-carrier transmission symbol comprised of multiple waveforms carrying multiple sets of modulation symbols in the time domain on multiple sets of subbands (block 952), means for removing the cyclic prefix from the received transmission symbol (block 954), means for transforming the remaining received transmission symbol to the frequency domain to obtain K frequency-domain values (block 956), means for obtaining multiple sets of frequency-domain values for the multiple sets of subbands from among the K frequency-domain values (block 958), and means for transforming each set of frequency-domain values to the time domain to obtain a respective set of modulation symbols sent in the multi-carrier transmission symbol (block 960).

Figure 10:
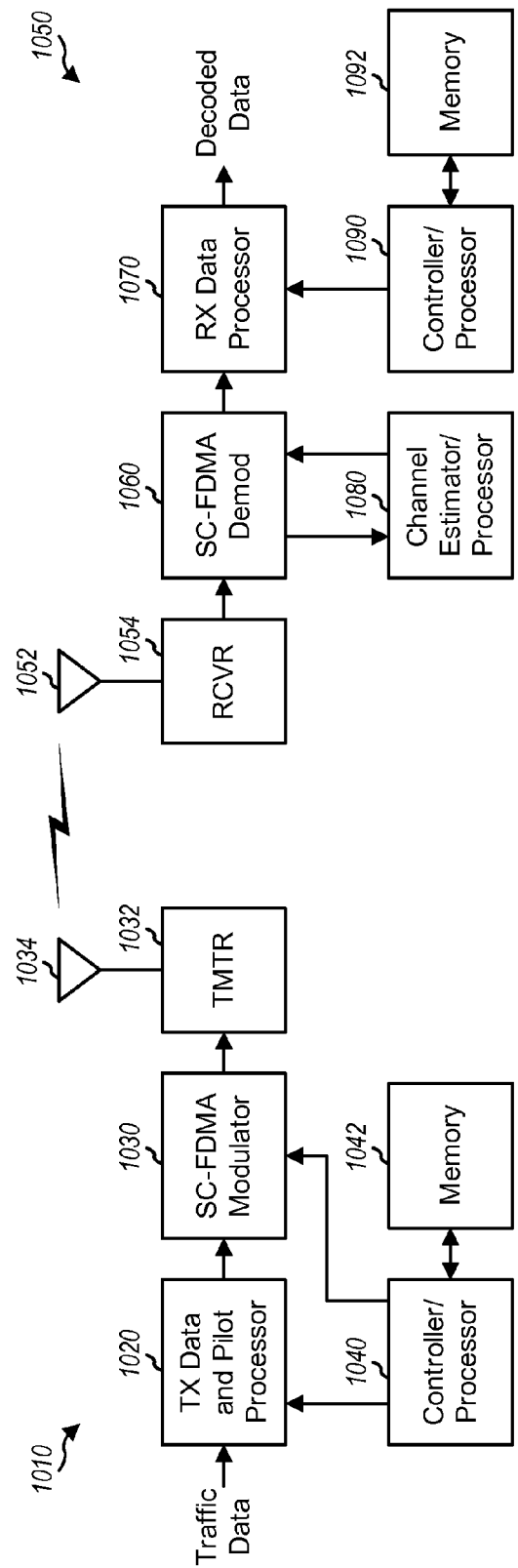
FIG. 10 shows a block diagram of a transmitter and a receiver.

FIG. 10 shows a block diagram of a transmitter 1010 and a receiver 1050. For the forward link, transmitter 1010 is part of a base station and receiver 1050 is part of a terminal. For the reverse link, transmitter 1010 is part of a terminal and receiver 1050 is part of a base station.

At transmitter 1010, a transmit (TX) data and pilot processor 1020 encodes, interleaves, and symbol maps data (e.g., traffic data and signaling) and generates data symbols. Processor 1020 also generates pilot symbols and multiplexes the data symbols and pilot symbols. A data symbol is a modulation symbol for data, a pilot symbol is a modulation symbol for pilot, a modulation symbol is a complex value for a point in a signal constellation (e.g., for PSK or QAM), and a symbol is a complex value. An SC-FDMA modulator 1030 performs modulation on the multiplexed data and pilot symbols and generates transmission symbols. Modulator 1030 may generate single-carrier transmission symbols, e.g., as shown in FIG. 3A or 3B. Modulator 1030 may also implement multi-carrier SC-FDMA modulator 600 in FIG. 6 and generate multi-carrier transmission symbols, e.g., as shown in FIG. 7. A transmitter unit (TMTR) 1032 processes (e.g., converts to analog, amplifies, filters, and frequency upconverts) the transmission symbols and generates a radio frequency (RF) modulated signal, which is transmitted via an antenna 1034.

At receiver 1050, an antenna 1052 receives the transmitted signal and provides a received signal. A receiver unit (RCVR) 1054 conditions (e.g., filters, amplifies, frequency downconverts, and digitizes) the received signal and provides input samples. An SC-FDMA demodulator (Demod) 1060 performs demodulation on the input samples and provides received data values and received pilot values for subbands used for data and pilot transmission. A channel estimator/processor 1080 derives a channel estimate based on the received pilot values. Demodulator 1060 also performs data detection (or equalization) on the received data values with the channel estimate and provides data symbol estimates. A receive (RX) data processor 1070 symbol demaps, deinterleaves, and decodes the data symbol estimates and provides decoded data. In general, the processing by demodulator 1060 and RX data processor 1070 at receiver 1050 is complementary to the processing by modulator 1030 and TX data and pilot processor 1020, respectively, at transmitter 1010.

Controllers/processors 1040 and 1090 direct the operation of various processing units at transmitter 1010 and receiver 1050, respectively. Memories 1042 and 1092 store program codes and data for transmitter 1010 and receiver 1050, respectively.

The techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented with one or more ASICs, DSPs, processors, and so on.

For a firmware and/or software implementation, the techniques may be implemented with modules (e.g., procedures, functions, and so on) that perform the functions described herein. The software codes may be stored in a memory (e.g., memory 1042 or 1092 in FIG. 10) and executed by a processor (e.g., processor 1040 or 1090). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured:
   to generate multiple single-carrier frequency division multiple access waveforms carrying modulation symbols in time domain on multiple sets of subbands,
   to pre-process the multiple single-carrier frequency division multiple access waveforms by cyclically delaying the multiple single-carrier frequency division multiple access waveforms by different amounts to obtain multiple pre-processed single-carrier frequency division multiple access waveforms, and
   to generate a transmission symbol with the multiple pre-processed single-carrier frequency division multiple access waveforms; and
   a memory coupled to the at least one processor.

2. The apparatus of claim 1, wherein the at least one processor is configured to filter the multiple single-carrier frequency division multiple access waveforms with a set of at least one filter.

3. The apparatus of claim 2, wherein the at least one processor is configured to select the set of at least one filter from among multiple sets of at least one filter.

4. The apparatus of claim 2, wherein the at least one processor is configured to select the set of at least one filter to achieve a low peak-to-average power ratio for the transmission symbol.

5. The apparatus of claim 1, wherein the at least one processor is configured to transform multiple sets of modulation symbols to frequency domain to obtain multiple sets of frequency domain values, to map the multiple sets of frequency domain values to the multiple sets of subbands to generate multiple sequences, and to transform the multiple sequences to time domain to generate the multiple single-carrier frequency division multiple access waveforms.

6. The apparatus of claim 1, wherein the at least one processor is configured to combine the multiple pre-processed waveforms to obtain a composite waveform, and to append a cyclic prefix to the composite waveform to generate the transmission symbol.

7. The apparatus of claim 1, wherein each of the multiple sets of subbands includes multiple adjacent subbands.

8. The apparatus of claim 1, wherein each of the multiple sets of subbands includes multiple subbands distributed across a plurality of subbands.

9. The apparatus of claim 8, wherein each of the multiple sets of subbands includes multiple groups of subbands.

10. The apparatus of claim 1, wherein the at least one processor is configured to generate two single-carrier frequency division multiple access waveforms carrying modulation symbols on two sets of subbands.

11. The apparatus of claim 10, wherein the two single-carrier frequency division multiple access waveforms include first and second single-carrier frequency division multiple access waveforms, and wherein the at least one processor is configured to cyclically delay the first single-carrier frequency division multiple access waveform by zero sample and to cyclically delay the second single-carrier frequency division multiple access waveform by $K/(2N)$ samples, where $K$ is the total number of subbands and $N$ is the number of subbands in each of the two sets.

12. A method comprising:
   generating multiple single-carrier frequency division multiple access waveforms carrying modulation symbols in time domain on multiple sets of subbands;
   pre-processing the multiple single-carrier frequency division multiple access waveforms to obtain multiple pre-processed single-carrier frequency division multiple access waveforms, wherein the pre-processing comprises cyclically delaying the multiple single-carrier frequency division multiple access waveforms by different amounts; and
   generating a transmission symbol with the multiple pre-processed single-carrier frequency division multiple access waveforms.

13. The method of claim 12, wherein the generating the multiple single-carrier frequency division multiple access waveforms comprises:
   transforming multiple sets of modulation symbols to frequency domain to obtain multiple sets of frequency domain values,
   mapping the multiple sets of frequency domain values to the multiple sets of subbands to generate multiple sequences, and
   transforming the multiple sequences to time domain to generate the multiple single-carrier frequency division multiple access waveforms.

14. The method of claim 12, wherein the generating the transmission symbol comprises combining the multiple pre-processed waveforms to obtain a composite waveform, and appending a cyclic prefix to the composite waveform to generate the transmission symbol.

15. An apparatus comprising:
   means for generating multiple single-carrier frequency division multiple access waveforms carrying modulation symbols in time domain on multiple sets of subbands;
   means for pre-processing the multiple single-carrier frequency division multiple access waveforms to obtain multiple pre-processed single-carrier frequency division multiple access waveforms, wherein the means for pre-processing comprises means for cyclically delaying the multiple waveforms by different amounts; and
   means for generating a transmission symbol with the multiple pre-processed single-carrier frequency division multiple access waveforms.

16. The apparatus of claim 15, wherein the means for generating the multiple single-carrier frequency division multiple access waveforms comprises:
   means for transforming multiple sets of modulation symbols to frequency domain to obtain multiple sets of frequency domain values,
   means for mapping the multiple sets of frequency domain values to the multiple sets of subbands to generate multiple sequences, and
   means for transforming the multiple sequences to time domain to generate the multiple single-carrier frequency division multiple access waveforms.

17. The apparatus of claim 15, wherein the means for generating the transmission symbol comprises:
   means for combining the multiple pre-processed waveforms to obtain a composite waveform, and
   means for appending a cyclic prefix to the composite waveform to generate the transmission symbol.

18. An apparatus comprising:
at least one processor configured to receive a transmission symbol comprised of multiple single-carrier frequency division multiple access waveforms carrying multiple sets of modulation symbols on multiple sets of subbands, wherein the multiple single-carrier frequency division multiple access waveforms are pre-processed by cyclically delaying the multiple single-carrier frequency division multiple access waveforms by different amounts to obtain preprocessed multiple single-carrier frequency division multiple access waveforms which are combined to form the transmission symbol, to transform the received transmission symbol to frequency domain to obtain multiple sets of frequency-domain values for the multiple sets of subbands, and to transform the multiple sets of frequency-domain values to time domain to obtain estimates for the multiple sets of modulation symbols; and
a memory coupled to the at least one processor.

19. The apparatus of claim 18, wherein the at least one processor is configured to filter the multiple sets of frequency-domain values with a set of at least one filter.

20. An apparatus comprising:

means for receiving a transmission symbol comprised of multiple single-carrier frequency division multiple access waveforms carrying multiple sets of modulation symbols on multiple sets of subbands, wherein the multiple single-carrier frequency division multiple access waveforms are pre-processed by cyclically delaying the multiple single-carrier frequency division multiple access waveforms by different amounts to obtain preprocessed multiple single-carrier frequency division multiple access waveforms which are combined to form the transmission symbol;

means for transforming the received transmission symbol to frequency domain to obtain multiple sets of frequency-domain values for the multiple sets of subbands; and means for transforming the multiple sets of frequency-domain values to time domain to obtain estimates for the multiple sets of modulation symbols.

* * * * *